US012598689B2

(12) United States Patent
Zimmermann et al.

(10) Patent No.: US 12,598,689 B2
(45) **Date of Patent: *Apr. 7, 2026**

(54) ROTATING CORE PLASMA COMPRESSION SYSTEM

(71) Applicant: GENERAL FUSION INC., Richmond (CA)

(72) Inventors: Joerg Zimmermann, Vancouver (CA); Robert Bouchal, Surrey (CA); William Randolph Smith, II, Vancouver (CA)

(73) Assignee: General Fusion Inc., Richmond (CA)

(*) Notice: Subject to any disclaimer, the term of this patent is extended or adjusted under 35 U.S.C. 154(b) by 338 days.

This patent is subject to a terminal disclaimer.

(21) Appl. No.: 18/260,700

(22) PCT Filed: Dec. 16, 2021

(86) PCT No.: PCT/CA2021/051824
§ 371 (c)(1),
(2) Date: Jul. 7, 2023

(87) PCT Pub. No.: WO2022/155725
PCT Pub. Date: Jul. 28, 2022

(65) Prior Publication Data

US 2024/0062919 A1 Feb. 22, 2024

Related U.S. Application Data

(60) Provisional application No. 63/140,358, filed on Jan. 22, 2021.

(51) Int. Cl.
*H05H 1/02* (2006.01)
*G21B 3/00* (2006.01)

(52) U.S. Cl.
CPC ............... *H05H 1/02* (2013.01); *G21B 3/008* (2013.01)

(58) Field of Classification Search
None
See application file for complete search history.

(56) References Cited

U.S. PATENT DOCUMENTS 3,523,206 A * 8/1970 Drabier .................... H05H 1/16 313/154
3,668,067 A * 6/1972 Christofilos ............. G21B 1/00 376/140

(Continued)

FOREIGN PATENT DOCUMENTS

CN 101496111 7/2009
CN 105185417 A 12/2015

(Continued)

OTHER PUBLICATIONS

Ning Ding, Zhenhua Yang, Cheng Ning, "Optimized Design Analysis of Metal Wire Array Load for Z-Hooping Plasma Implosion Experiment", Physics Letters, vol. 03, Mar. 12, 2004.

(Continued)

*Primary Examiner* — Srinivas Sathiraju
(74) *Attorney, Agent, or Firm* — Knobbe, Martens, Olson & Bear, LLP

(57) ABSTRACT

A plasma compression system comprises a plasma containment vessel, an annular rotating core inside the vessel, and a plurality of compression drivers fixedly mounted to an outer surface of the vessel wall. The annular rotating core contains a liquid medium and is rotatable to circulate the liquid medium and form a liquid liner with a cavity. The rotating core comprises an outer surface spaced from an inner surface of the vessel wall to define an annular gap, and a plurality of implosion drivers each comprising a pusher bore with a pusher piston slideable therein. Each pusher bore extends through the rotating core. The plurality of compression drivers compresses a compression fluid in the annular gap and creates a pressure pulse, such that when the rotating (Continued)

core rotates and the liquid medium fills the pusher bores, the pusher pistons are operable to push the liquid medium inwards to collapse the liquid liner and compress a plasma in the cavity.

22 Claims, 21 Drawing Sheets

(56) References Cited

U.S. PATENT DOCUMENTS

| | | | | |
|---|---|---|---|---|
| 4,140,057 | A | 2/1979 | Turchi et al. | |
| 4,217,171 | A * | 8/1980 | Schaffer | H05H 1/52 376/125 |
| 4,233,537 | A * | 11/1980 | Limpaecher | H05H 1/14 376/139 |
| 4,252,605 | A * | 2/1981 | Schaffer | G21B 1/00 376/125 |
| 4,252,607 | A * | 2/1981 | Thode | G21B 1/23 376/105 |
| 4,263,095 | A * | 4/1981 | Thode | G21B 1/19 376/152 |
| 4,269,658 | A * | 5/1981 | Ohkawa | H05H 1/06 376/125 |
| 4,626,400 | A * | 12/1986 | Jassby | G21B 1/00 976/DIG. 1 |
| 8,891,719 | B2 * | 11/2014 | Howard | H05H 1/02 376/150 |
| 9,271,383 | B2 * | 2/2016 | Howard | H05H 1/54 |
| 9,477,009 | B2 * | 10/2016 | Bourbiaux | G01V 20/00 |
| 9,596,745 | B2 * | 3/2017 | Laberge | G21B 1/00 |
| 10,002,680 | B2 * | 6/2018 | Laberge | H05H 1/02 |
| 10,418,170 | B2 * | 9/2019 | Rath | H01F 27/34 |
| 10,798,808 | B2 | 10/2020 | Zimmermann et al. | |
| 10,910,149 | B2 * | 2/2021 | Rath | H05H 1/10 |
| 10,925,145 | B2 * | 2/2021 | Sangermano | F03G 7/00 |
| 11,064,601 | B2 * | 7/2021 | Zimmermann | H05H 1/02 |
| 2005/0129161 | A1 | 6/2005 | Laberge | |
| 2006/0198483 | A1 | 9/2006 | Laberge | |
| 2006/0198486 | A1 | 9/2006 | Laberge et al. | |
| 2014/0163939 | A1 * | 6/2014 | Bourbiaux | E21B 43/26 703/2 |
| 2019/0139650 | A1 | 5/2019 | Laberge et al. | |
| 2020/0027572 | A1 | 1/2020 | Krasnoff | |
| 2020/0236770 | A1 * | 7/2020 | Zimmermann | H05H 1/54 |
| 2020/0245445 | A1 | 7/2020 | Zimmermann et al. | |
| 2024/0062918 | A1 * | 2/2024 | Laberge | G21B 1/17 |
| 2024/0062919 | A1 * | 2/2024 | Zimmermann | H05H 1/02 |
| 2025/0191790 | A1 * | 6/2025 | Howard | G21B 1/05 |

FOREIGN PATENT DOCUMENTS

| | | | | |
|---|---|---|---|---|
| CN | 205069135 | | 3/2016 | |
| CN | 110785819 | A | 2/2020 | |
| CN | 110786080 | A | 2/2020 | |
| GB | 2064203 | A * | 6/1981 | G21B 1/00 |
| WO | WO 2008/033587 | | 3/2008 | |
| WO | WO 2018/094043 | | 5/2018 | |
| WO | WO 2018/201226 | | 11/2018 | |
| WO | WO 2022/155725 | A1 | 7/2022 | |
| WO | WO 2022/155726 | A1 | 7/2022 | |
| WO | WO-2023173210 | A1 * | 9/2023 | G21B 1/05 |

OTHER PUBLICATIONS

Gang Wu, Aici Qiu, Liangping Wang, Min Lv, Mengtong Qiu, Peitian Cong, Study on K-layer radiation of double-jet Z-pinch neon plasma, Physics Letters, vol. 01, Jan. 15, 2011.

Office Action received in Chinese Application No. 202180091471.6, dated Mar. 18, 2024.

International Search Report and Written Opinion in PCT/CA2021/051824 mailed on Feb. 4, 2022 in 7 pages.

J. Huneault, "The stability of Impulsively collapsed liquid cavities," McGill University (Canada), 2019.

Extended Search Report received in European Application No. 21920164.7 dated Apr. 5, 2024.

International Search Report and Written Opinion in PCT/CA2021/051825 dated Mar. 4, 2022 in 8 pages.

International Search Report and Written Opinion received in International Application No. PCT/CA2023/050331, dated May 18, 2023.

C.L. Nehl et al., "Retrospective of the ARPA-E Alpha fusion program," J. Fusion Energy vol. 38, No. 5, pp. 506-521 (2019).

Extended Search Report received in European Application No. 21920165.4 dated Apr. 4, 2024.

* cited by examiner

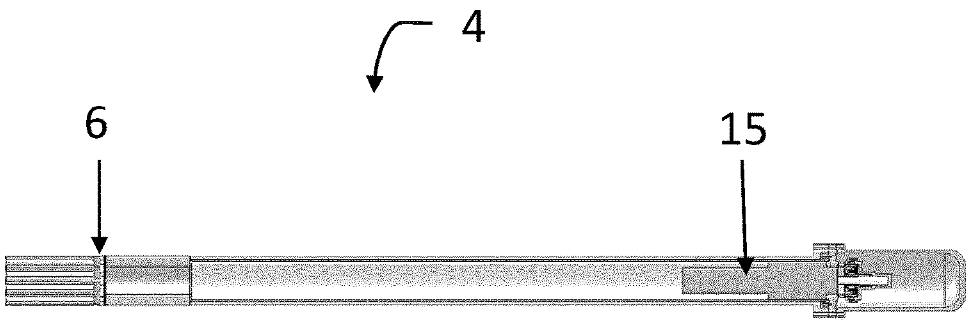
FIG. 5A Initial position 0 ms
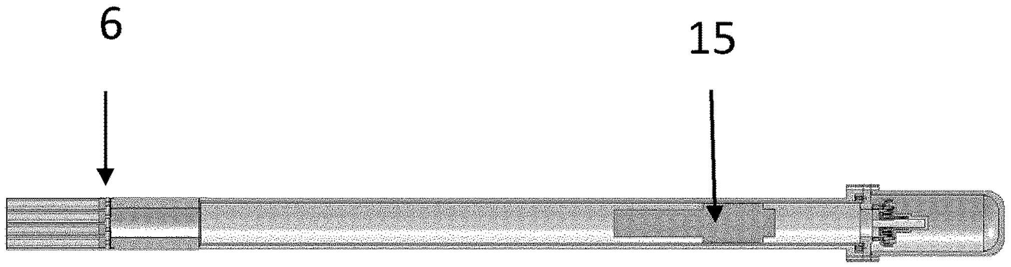
FIG. 5B 5 ms
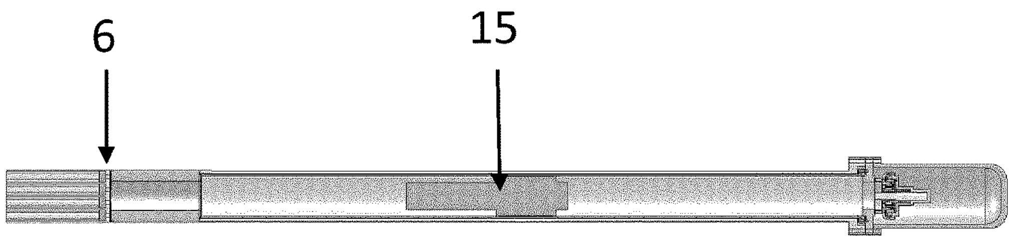
FIG. 5C 10 ms

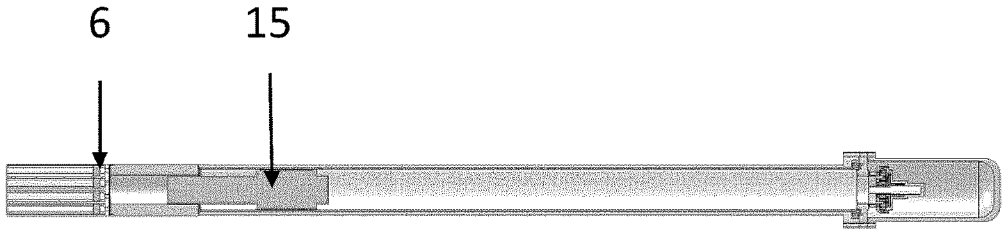
FIG. 5D 15 ms
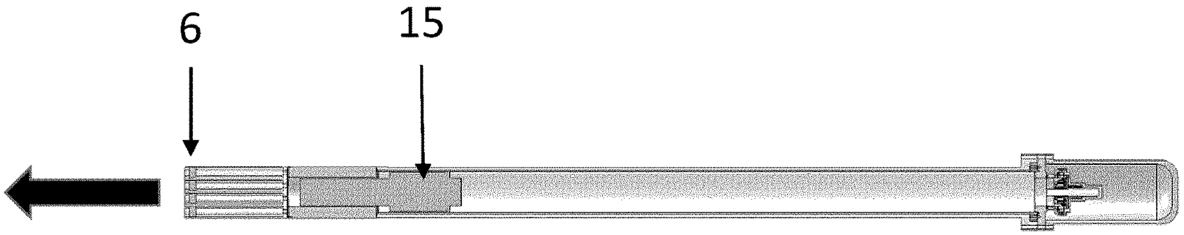
FIG. 5E 19 ms

ROTATING CORE PLASMA COMPRESSION SYSTEM

TECHNICAL FIELD

The present disclosure generally relates to a rotating core fluid compression system used for compressing plasma.

BACKGROUND

Unless otherwise indicated herein, the materials described in this section are not prior art to the claims in this application and are not admitted to be prior art by inclusion in this section.

Nuclear fusion is the process of combining two nuclei, whereby the reaction releases energy. The release of energy is due to a small difference in mass between the reactants and the products of the fusion reaction and is governed by $dE=dmc^2$. Common reactants are plasma forms of deuterium (a hydrogen nucleus with one proton and one neutron) and tritium (a hydrogen nucleus having one proton and two neutrons). Fusion of these two reactants yields a helium −4 nucleus, a neutron, and energy captured as heat. Achieving fusion of reactants requires high temperature and high pressure (density) of the reactants. Fusion conditions for certain approaches to fusion may be in the order of 800 megapascals of pressure and plasma temperatures of 150 million degrees Celsius.

Plasma is a state of matter similar to gas, and is composed of an ionized gas and free electrons. Plasma comprising ionized fusion reactants inside a reaction vessel can be used to initiate fusion reactions. For example, to achieve conditions with sufficient temperatures and densities for fusion in a plasma, the plasma needs to be positioned, confined, and compressed. Several approaches to manipulate and compress plasmas are known. In one approach, conductive coils are positioned around the circumference of the reaction vessel and are energized with electrical current to produce a magnetic field. This magnetic field interacts with the magnetized plasma to manipulate its shape, position, and in some approaches, its compression (density). Other approaches to achieving fusion conditions involve using strong magnetic fields to compress the plasma, during which adiabatic heating bring the plasma to fusion conditions. Some of these approaches have demonstrated fusion products, however, to date these plasma compression systems have not produced more energy than they consume.

Another approach to achieving fusion conditions is to compress a hydrogen plasma using more conventional means such as mechanical pistons. These mechanical plasma compression systems compress the plasma within the fusion energy device by forming a substantially cylindrical cavity into which the plasma is positioned. The cylindrical cavity is formed by rotating a liquid metal cavity liner such that centrifugal force moves the liquid metal against the walls of the rotating cylinder, forming a liquid liner. The liquid metal liner is collapsed by radially imploding the cavity. The plasma is compressed as the liquid metal liner collapses. During this compression, fusion conditions are achieved, the fusion reaction occurs, and the heat byproduct is released into the liquid metal liner. This heat energy is removed from the fusion energy device by circulating the heated liquid metal through a conventional heat exchanger. This type of plasma compression system is known as Magnetized Target Fusion, hereafter "MTF", and is the plasma compression system used by General Fusion.

Systems for forming a cavity in a liquid liner and for imploding the liquid liner, as known in the prior art, form a substantially cylindrical cavity that is collapsed by radially imploding a cylindrically shaped liquid liner. An example of such prior art imploding liquid liner system is the LINUS system that was developed in the US Naval Research Laboratory in the 1970s. In the LINUS system a rotating cylindrical liquid metal liner is driven radially by free-pistons. The pistons are driven by a high pressure gas axially causing radial motion of the free-surface of the rotating liquid liner. The initial rotation of the liquid metal is provided by rotating the cylindrical vessel in which the liquid medium is contained. The entire system including the cylindrical vessel and pistons is rotated about its longitudinal axis, so that a cylindrical cavity is formed along and coaxial with the axis of rotation. In hypothetical LINUS systems that would be large enough to produce power on a commercial scale, the rotational mass this system would create very large centripetal structural forces.

Another example of such a prior art system is U.S. Pat. No. 10,002,680 B2 6/2018 Laberge et. al. that was developed by General Fusion Inc. in 2009. In this system, a rotating liquid metal liner creates a vortex cavity within a pressure vessel, and implosion of the liner and compression of plasma in the cavity is driven by acoustic pressure waves generated by movable pistons striking anvils positioned radially around the pressure vessel. These pistons move within bores which are fixedly mounted to the outer wall of the pressure vessel.

Another example of such a prior art system is U.S. Pat. No. 10,798,808 B2 10/2020 Zimmerman et al. that was developed by General Fusion Inc. in 2017. In this system, a rotor immersed in a liquid medium circulates the liquid medium to create a liquid liner surrounding a vortex cavity containing plasma, which is then collapsed by compression drivers positioned radially outside of and fixedly mounted to the pressure vessel. In this design, the liquid medium partially fills the compression driver such that the liquid medium spans a gap between the rotor and the non-rotating pressure vessel. The fluid within the annular gap is a liquid. When the rotor circulates the liquid liner, the liquid medium in the gap is subject to large shear forces due to fluid coupling, requiring additional energy to overcome the torque and drive the rotor.

It is therefore desirable to provide an improvement to existing systems for imploding a liquid liner and compressing plasma.

SUMMARY

According to one aspect of the invention, there is provided a plasma compression system comprising a plasma containment vessel having a vessel wall, an annular rotating core inside the vessel, and a plurality of compression drivers fixedly mounted to an outer surface of the vessel wall. The annular rotating core contains a liquid medium and is rotatable inside the vessel to circulate the liquid medium and form a liquid liner with a cavity. The rotating core comprises an outer surface spaced from an inner surface of the vessel wall to define an annular gap, and a plurality of implosion drivers each comprising a pusher bore with a pusher piston slideable therein. The fluid within the annular gap is a gas. Each pusher bore extends through the rotating core and has a proximal end in fluid communication with the annular gap and a distal end in fluid communication with the liquid medium.

In one aspect, the plurality of compression drivers can be each fixedly mounted to an outer surface of the vessel wall and comprise an accumulator for storing a pressurized gas and a drive valve in fluid communication with the accumulator and a vessel wall opening in the vessel wall. When the rotating core rotates, the drive valves can be operable to discharge pressurized gas from the accumulator into the annular gap thereby creating a pressure pulse that moves the pusher pistons and pushes the liquid medium inwards to collapse the liquid liner and compress a plasma in the cavity.

In another aspect, the plurality of compression drivers can each comprises a driver bore with a driver piston slideable therein; each driver bore can be fixedly mounted to an outer surface of the vessel wall and have a distal end in fluid communication with an opening in the vessel wall. In this aspect, the plasma compression system also comprises a prime mover operable to move the driver piston along the driver bore; and a compression fluid such as helium in the annular gap and the driver bores and in fluid communication with the driver and pusher pistons. Movement of the driver pistons towards the vessel wall openings compresses the compression fluid and creates a pressure pulse that moves the pusher pistons, such that when the rotating core rotates and the liquid medium fills the pusher bores, the pusher pistons are operable to push the liquid medium inwards to collapse the liquid liner and compress a plasma in the cavity.

The plasma compression system can further comprise a plasma generator in fluid communication with the vessel and operable to inject a plasma into the cavity.

The vessel can have a shape selected from a group consisting of cylindrical, ovoid and spherical, and the outer surface of the rotating core can have a curvature conforming to a curvature of the inner surface of the vessel wall. The pusher bore can have a shorter length than the driver bore, and the pusher piston can have a lower mass than the driver piston. The plurality of compression drivers can extend generally radially, relative to an axis of rotation of the rotating core and can be arranged in a plurality of vertically stacked layers outside of the vessel. Additionally, the plurality of implosion drivers can extend generally radially, relative to an axis of rotation of the rotating core and can be arranged in a plurality of vertically stacked layers in the rotating core.

For a compression driver having an accumulator and a drive valve, there may further comprise a relief tank and a rebound valve in fluid communication with the relief tank and the vessel wall opening. The rebound valve is operable to open after the pressurized gas has discharged into the annular gap and the drive valve is closed, thereby allowing the pressurized gas to flow from the annular gap into the relief tank. The plasma compression system can further comprise a controller in communication with the drive valve and rebound valve; the controller has a processor and a computer-readable memory having encoded thereon instructions that when executed by the processor causes the controller to open the drive valve and close the rebound valve during a compression phase of a compression shot wherein the pressurized gas flows from the accumulator into the annular gap, to keep the drive valve open and the rebound valve closed during a rebound recovery phase of the compression shot wherein some of the pressurized gas flows from the annular gap into the accumulator, and to close the drive valve and open the rebound valve during an energy dissipation phase wherein some other of the pressurized gas flows from the annular gap into the relief tank. Alternatively, the controller can be replaced with a mechanical assembly providing the same function.

For a compression driver having a driver bore with a driver piston, each driver bore can have a larger diameter than the vessel wall opening, and each compression driver can further comprise an annular face surface interconnecting the vessel wall opening and a distal end of the driver bore, whereby compression of the compression fluid applies an inward pressure on the annular face surface which counteracts an outward pressure on the vessel. The driver piston can comprise an annular ledge parallel to the annular face surface and an annular rim perpendicular to and adjacent the annular ledge, such that a compression fluid channel is formed by the annular rim, annular face surface and annular ledge when the driver piston is at the vessel wall opening.

For a compression driver having a driver bore with a driver piston, the prime mover can comprise an accumulator containing a pressurized driver fluid and a driver fluid valve fluidly coupling the accumulator to each driver piston. The driver fluid valve can be adjustable to adjust a pressure applied to the driver pistons by the driver fluid. Alternatively, the prime mover can comprise an electromagnetic source, electromagnetic coils at the driver bore, and an electrically-conductive element in each driver piston. The electromagnetic source can be operated to adjust the magnetic field along the length of the driver bore thereby controlling the acceleration profile of the driver piston. Alternatively, the prime mover can comprise a mechanical spring. The plasma compression system can further comprise at least one venting port in the driver bores for venting the driver fluid or the compression fluid from the driver bores. The venting port comprises a venting valve adjustable to adjust a pressure applied to the driver pistons by the driver fluid or the compression fluid thereby controlling the acceleration profile of the driver piston. The plasma compression system can further comprise electrodes at the distal end of the driver bores; the electrodes are operable to generate an electrical arc to heat the compression fluid.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

FIGS. 2A and 2B are cross-sectional side views of different embodiments of one compression driver, wherein FIG. 2A is a compression driver according to a first embodiment, comprising a driver piston and a driver bore, and multiple implosion drivers, each implosion driver comprising a pusher piston and a pusher bore, and FIG. 2B is a compression driver according to a second embodiment comprising an accumulator in fluid communication with a drive valve, and a relief tank in fluid communication with a rebound valve.

FIGS. 5A through 5E are cross-sectional side views of one compression driver according to the first embodiment and multiple implosion drivers in operation over a time period, wherein: FIG. 5A shows the compression driver with its driver piston in a start position prior to being triggered with a motive force; FIG. 5B shows the driver piston at approximately one third of its total travel limit within the driver bore; FIG. 5C shows the driver piston as it nears pusher pistons and just before the pusher pistons are accelerated; FIG. 5D shows the driver piston at a distal end of the driver bore while the pusher pistons are accelerated down the pusher bores; and FIG. 5E shows the pusher pistons at the limit of travel within the pusher bore.

FIGS. 6A to 6D are cross-sectional side views of a part of one compression driver according to the second embodiment over a compression shot, wherein FIG. 6A shows valve states of the compression driver in a pre-shot phase, FIG. 6B shows the valve states in a compression phase, FIG. 6C shows the valve states in a rebound recovery phase, and FIG. 6D shows the valve states in an energy dissipation phase.

FIGS. 10A and B are partial cross-sectional views of different embodiments of the plasma compression system showing the plasma containment vessel with plurality of ports formed in an outer wall of the vessel, compression drivers coupled to the ports of the vessel, and the rotating core, wherein FIG. 10A shows the first embodiment of the compression drivers.

DETAILED DESCRIPTION OF SPECIFIC EMBODIMENTS

Figure 1:
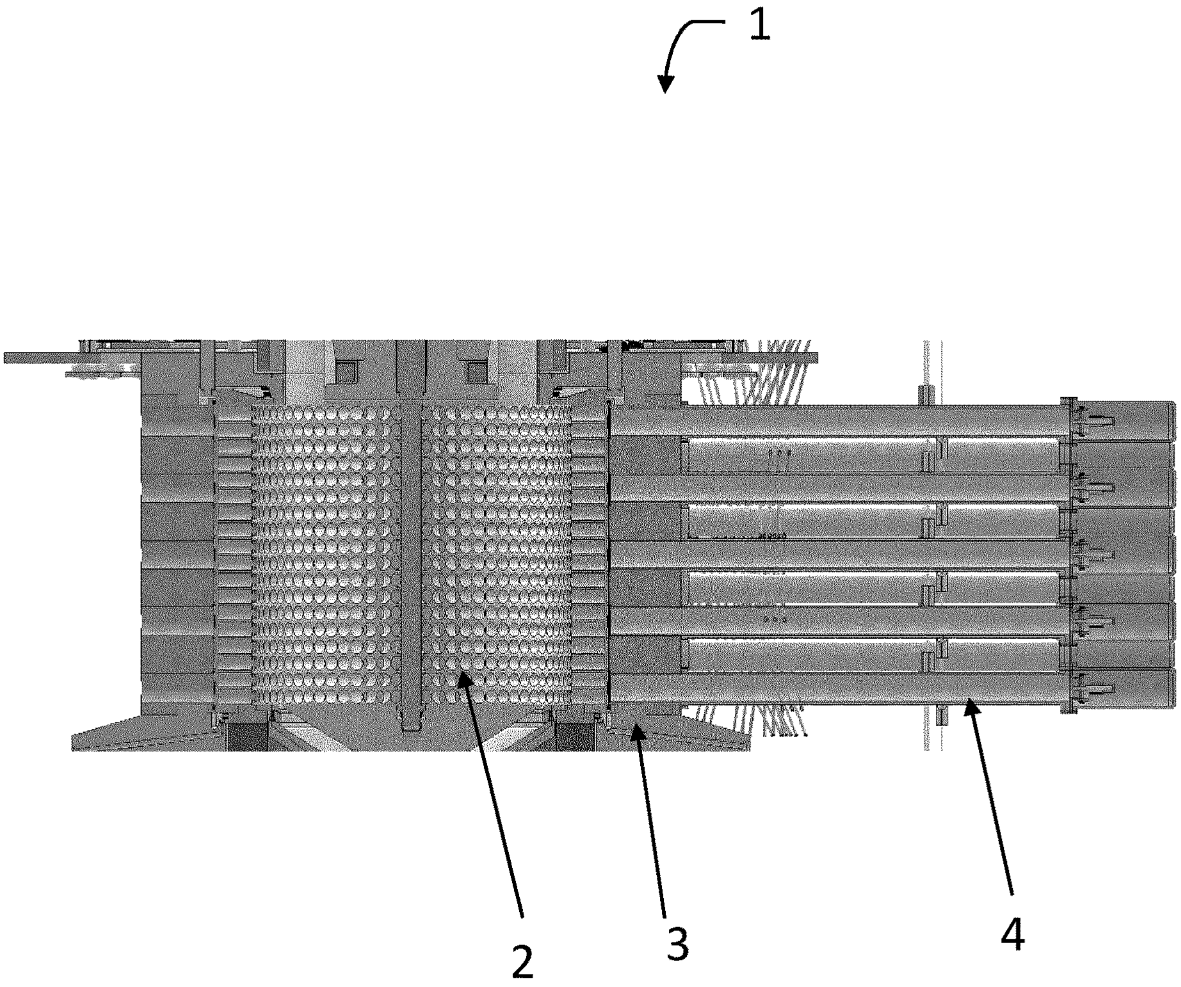
FIG. 1 is a cross-sectional side view of a plasma compression system comprising multiple compression drivers fixedly attached to a plasma containment vessel and a rotating core rotatable within the vessel and comprising multiple implosion drivers, according to one embodiment.

Referring to FIGS. 1-16, embodiments described herein relate to a plasma compression system 1 comprising a plasma containment vessel 3, an annular rotating core 2 rotatable inside the vessel 3 and having a plurality of implosion drivers 5, and a plurality of compression drivers 4, 40 fixedly mounted to the outside of the vessel 3. The plasma containment vessel 3 has an outer wall with a plurality of ports 12, and the rotating core 2 has an outer surface spaced from an inner surface of the vessel outer wall 3 to define an annular gap 10 (see FIGS. 2, 4), and an inner surface that defines an interior volume. The vessel 3 and rotating core 2 in the illustrated embodiment are cylindrical; however, the vessel 3 and rotating core 2 can have different geometries according to alternative embodiments. For example, the vessel 3 can be spherical or ovoid (not shown), and the rotating core 2 can have an outer surface that is straight (cylindrical) or curved with a curvature conforming to the curvature of the inner wall of the vessel 3, and an inner surface that can be straight (cylindrical) or curved (not shown). In another example, the inner wall of the vessel 3 can have circular steps of varying radial diameters (not shown), and the rotating core 2 can have an outer surface that is stepped with radial diameters conforming to the steps in the inner wall of the vessel. The rotating core 2 may consist of a unitary cylindrical unit, or in an alternative embodiment may consist of multiple, shaped sections (not shown) that are joined together to form the rotating core 2. The construction of the rotating core 2, or its sections, may use traditional metal forming and millright techniques, or may use metal printing techniques to create an internal webbed structure that optimizes the topology and stress loading within the rotating core 2.

The construction of the vessel 3 may be a singular cylinder, or in an alternative embodiment the vessel 3 may be assembled from a series of stacked rings (not shown) having an outer surface that is straight (cylindrical) or curved with a curvature conforming to the curvature of the inner wall of the vessel 3, and an inner surface that can be straight (cylindrical) or curved (not shown). The assembled rings may be joined by means known in the prior art, for example by welding the stacked ring interfaces or by use of other means to apply axial tension force to stacked ring assembly, such as bolts.

Figure 15A:
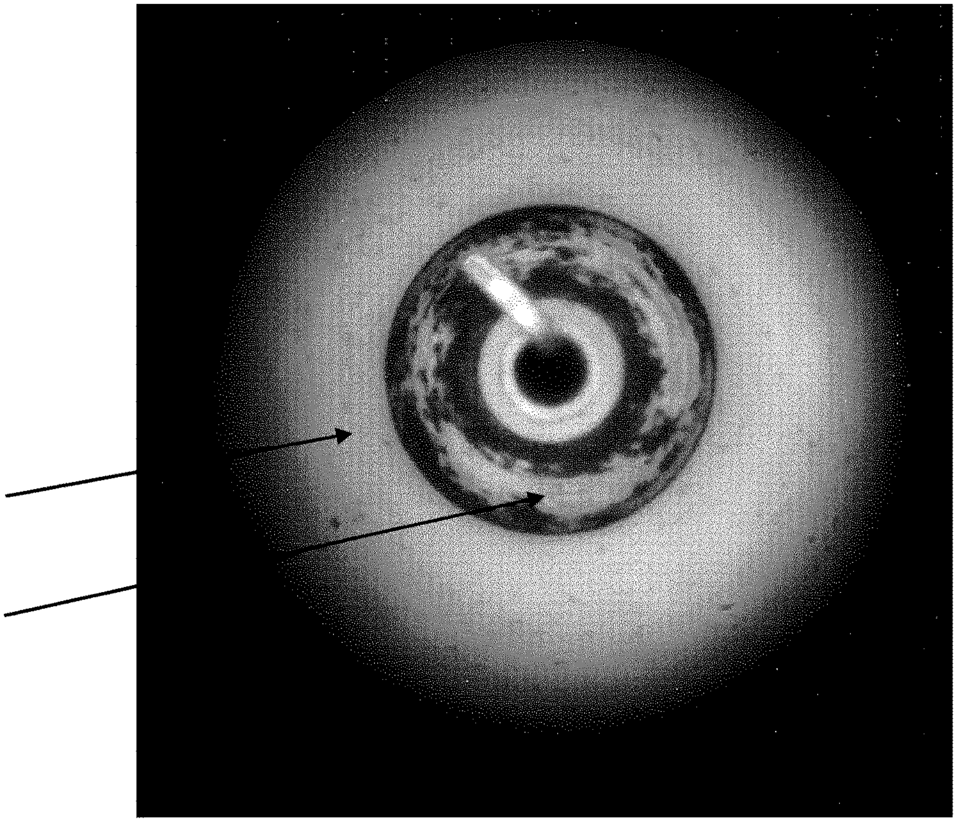
FIGS. 15A through 15D are a time series of photographs of the prototype embodiment in operation, showing a rotating liquid liner and cavity being collapsed by the compression system.
Figure 15B:
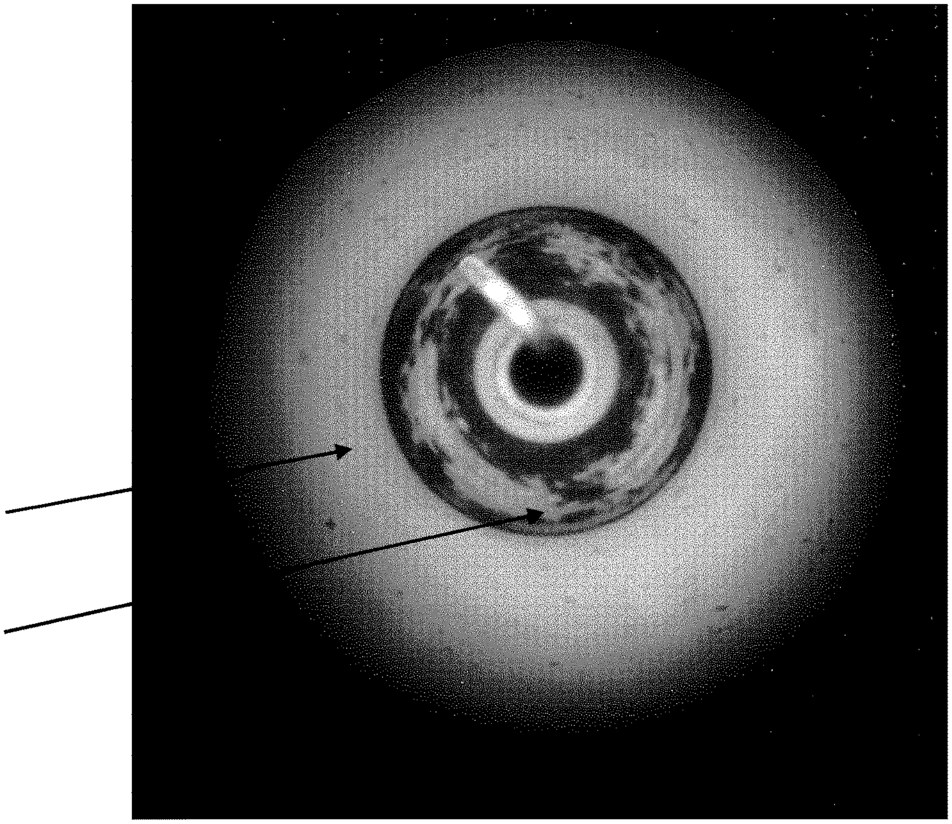

The rotating core 2 contains a liquid medium which can be circulated by the rotating core 2 to create a liquid liner 27 surrounding a cavity 28 (see FIGS. 15A and 15B). Plasma can be injected into the cavity 28, and the compression drivers 4, 40 are operable to compress a compression fluid and transmit a pressure pulse across the annular gap 10, which causes the implosion drivers 5 to push the liquid medium inwards to collapse the liquid liner 27 and compress the plasma. The liquid medium can be a liquid metal such as lithium and the compression fluid can be a light gas such as helium.

According to one embodiment and referring particularly to FIGS. 2A, 4, 5A-E, 7A and 10A, the compression drivers 4 each comprise a driver bore 13 and a driver piston 15 slideable therein to compress the compression fluid. The driver bore 13 has a driver bore wall 14 fixedly mounted to an outer surface of the vessel wall 3 and has a distal end in fluid communication with a corresponding port 12 in the vessel wall 3. The implosion drivers 5 each comprise a pusher bore 9 with a pusher piston 6 slideable therein. The pusher bore 9 extends through the rotating core 2 and has a proximal end 7 in fluid communication with the annular gap 10 and a distal end 8 in fluid communication with the liquid medium. The compression fluid fills the annular gap 10 and is in fluid communication with the driver and pusher pistons 15, 6.

When the rotating core 2 rotates, e.g. by means of electric drive motors, steam turbine or other form of rotational drive, the liquid medium fills the pusher bores 9 due to centripetal force and the liquid liner 27 defining the cavity 28 is formed. A plasma generator 29 (see FIG. 16) injects plasma into this cavity. Since the liquid medium is fully contained within the rotating core 2 (i.e. not contacting the vessel wall 3), it is in solid body rotation with minimal turbulence or cavity surface perturbation. In a compression operation, a prime mover is actuated and pushes the driver pistons 15 toward the port 12 in the vessel wall 3, thereby compressing the compression fluid in the annular gap 10 and creating the pressure pulse. This applies pressure on the pusher pistons 6, such that the pusher pistons 6 push the liquid medium inwards to collapse the liquid liner 27 and compress the plasma. A shear layer of the compression fluid is formed in the annular gap 10; since the shear layer is a light gas, the power required to drive the rotating core 2 is significantly lower compared to a design which uses a rotor immersed in the liquid medium and creates a shear layer of the liquid medium.

Each implosion driver 5 has a pusher piston 6 with a mass that is lower than a mass of the driver piston 15, and a pusher bore 9 with a length that is shorter than a length of the driver bore 13. Consequently, the compression drivers 4 convert a longer, lower power mechanical input in a stationary structure into a shorter, higher power mechanical output in the implosion drivers 5 in the rotating core 2. This is useful in applications that require a brief pulse of high pressure, such as in the plasma compression system developed by General Fusion Inc.

Figure 2A:
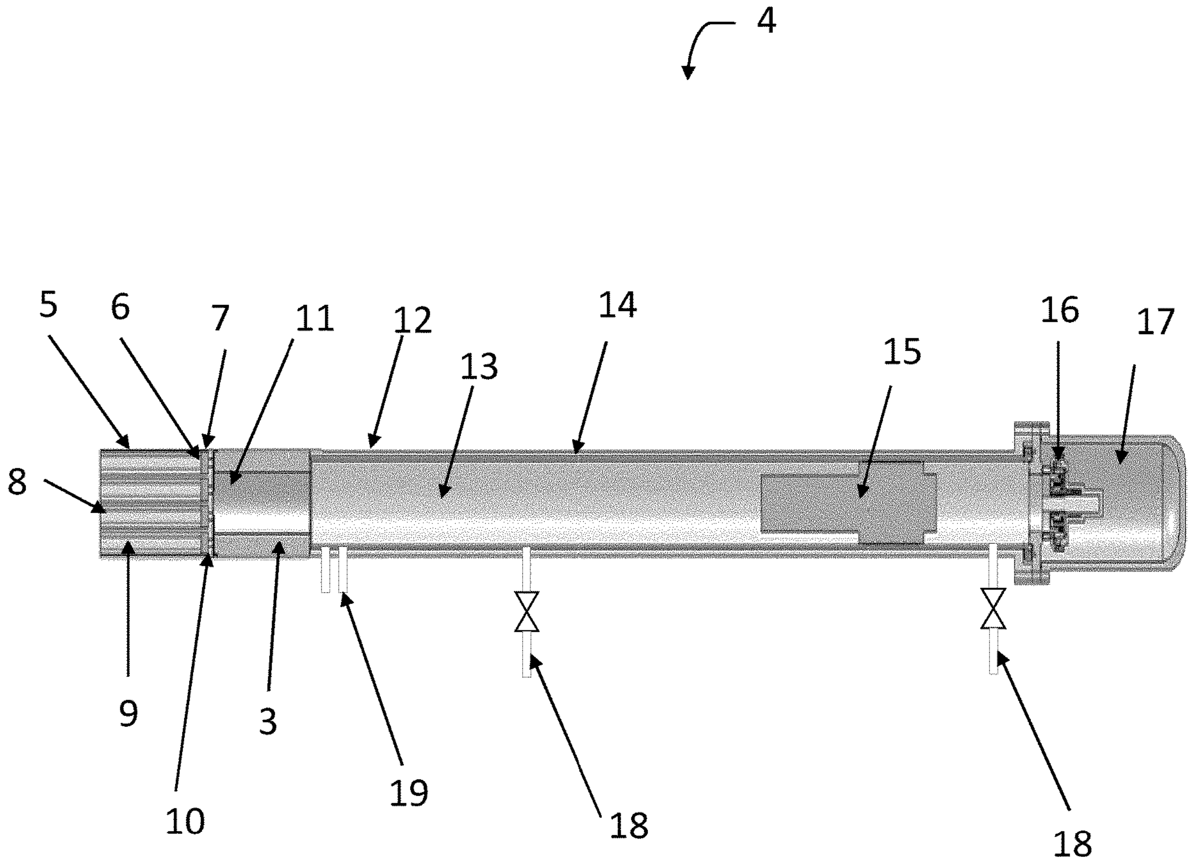
Figure 2B:
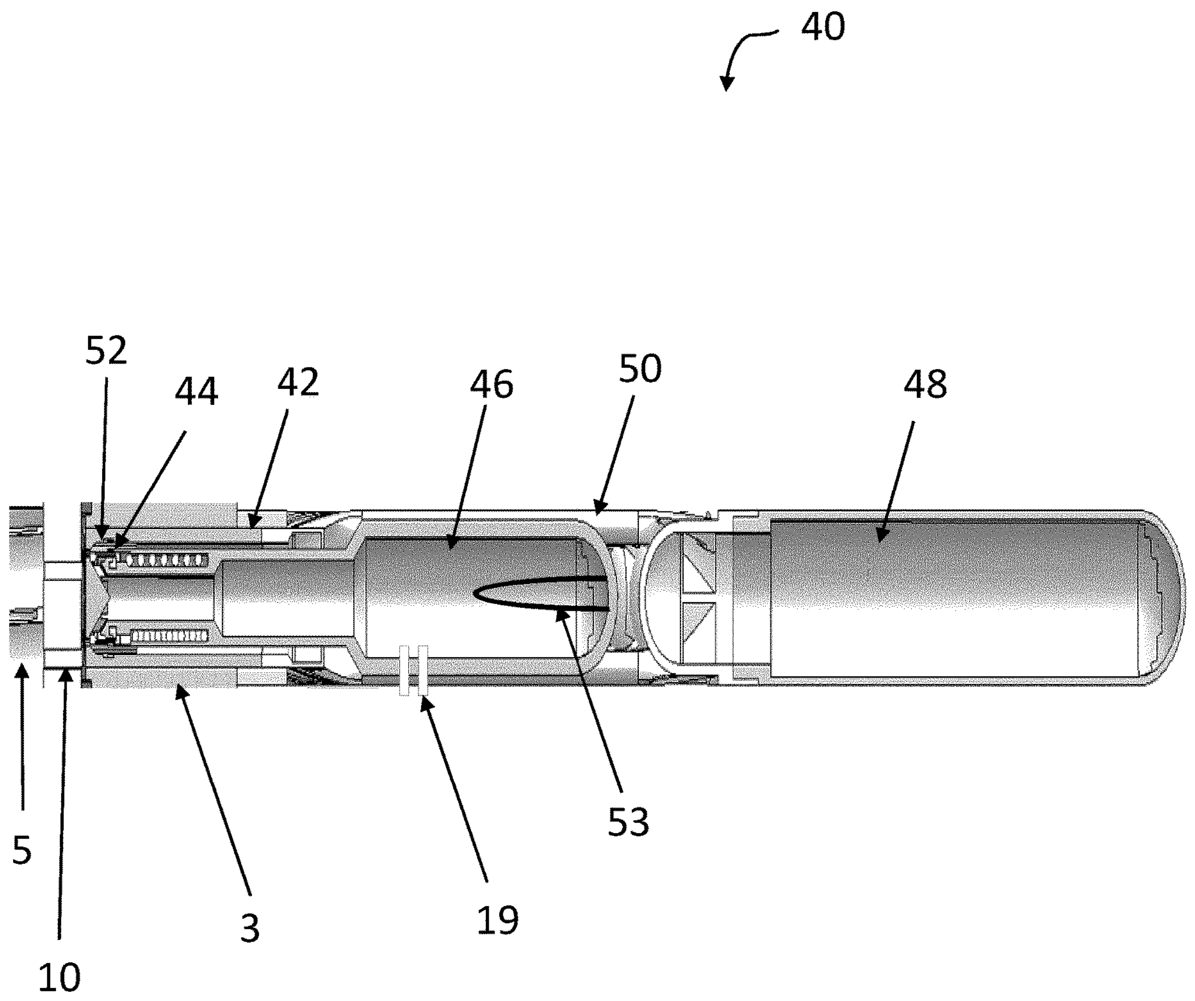
Figure 3:
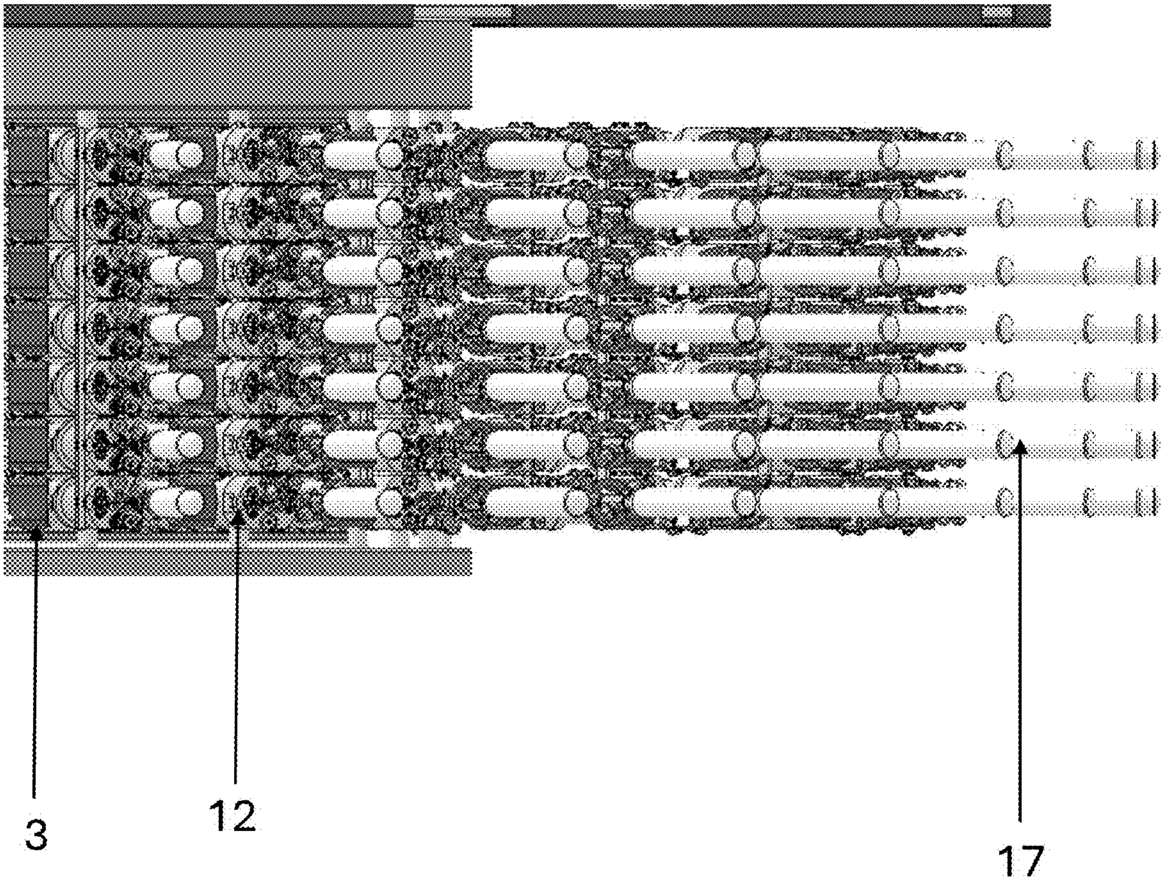
FIG. 3 is a photograph of some of the compression drivers attached to the vessel, according to a prototype embodiment.

Referring particularly to FIGS. 1 and 2A, the plasma compression system 1 comprises a plurality of compression drivers 4 and implosion drivers 5 that together can implode the liquid liner 27 with an ability to tune the implosion trajectory. The prime mover in this embodiment comprises an accumulator 17 coupled to a proximal end of the driver bore 13 by a valve 16, which can be opened to discharge a high pressure gas ("driver fluid") to move the driver piston 15 and compress compression fluid in the driver bore 13 in front of the driver piston 15. For the purpose of this application, the compression fluid can mean any fluid that can be compressed and can in one implementation be a gas. In another implementation, the compression fluid can be a mixture of a gas and a liquid medium, as long as the compression fluid in the driver bore 13 between the pistons 15 and 6 is compressible. In the illustrated embodiment, each compression driver 4 comprises its own accumulator 17; however in alternative embodiments, multiple compression drivers 4 can share a single accumulator, for example, one accumulator can be provided for each layer of compression drivers 4 (not shown), or a single accumulator can be provided for all the compression drivers 4 (not shown).

In alternative embodiments, the prime mover can comprise an electromagnetic source, or the prime mover can comprise a mechanical spring. Electromagnetic coils (not shown) can wind around the driver bore 13, and can be controlled to drive the driver piston 15 along the driver bore 13.

Prior to a compression operation, the driver and pusher pistons 15, 6 are in an initial position (see FIG. 5A). In the initial position, the compression fluid fills the driver bore 13 in front of driver piston 15 and the annular gap 10, and is in fluid communication with the pusher pistons 6; the pressure of the compression fluid between the pistons 15 and 6 in their initial positions is significantly less than the driver fluid pressure in the accumulator 17. For example, in one implementation the pressure of the compression fluid can be about 0.5 MPa, however it can be less or more than 0.5 MPa as long as it is significantly lower than the pressure of the driver fluid of the accumulator 17.

The pusher bores 9 will be filled with the liquid medium when the rotating core 2 rotates, such that the liquid medium pushes on the inner face of the pusher pistons 6, due to the centripetal force resulting from the rotation of the rotating core 2. In another implementation, a gas, mechanical means, or magnetic field can also apply pressure to the pusher piston 6 to prevent the pusher piston from being inadvertently accelerated down the pusher bore 9 (until a pre-determined/desired time). A retaining means, such as for example a ledge (not shown), can be provided at/near the open end 8 of the pusher bore 9 to prevent the pusher piston 6 from being dislodged out of the pusher bore 9. In addition, an additional retaining means can be provided at the proximal end (not shown) in order to prevent the pusher piston 6 being pushed into the annular gap 10 due to the pressure applied from the liquid medium in the pusher bore 9.

The driver and the pusher pistons 15, 6 can be made of any suitable material, such as for example, a stainless steel or a titanium alloy or any other suitable material that does not react with the liquid medium and/or the driver fluid and/or the compression fluid. In this embodiment, a diameter of each of the driver bores 13 and the driver pistons 15 is greater than a diameter of each of the pusher bores 9 and the pusher pistons 6; however, the diameter of each pusher bore 9 (pusher piston 6) can be the same or larger than the diameter of each driver bore 13 (driver piston 15) in alternative embodiments.

The valve 16 can be any kind of controllable fast valve. For example, the valve 16 can be a gas driven valve or an electromagnetic valve or any other suitable fast acting valve. The valve size and driver fluid pressure can be selected to allow a sufficient flow rate to accelerate the driver piston 15 down the driver bore 13 within a target time period.

During operation, the acceleration profile of the driver piston 15 can be controlled by controlling the pressure of the driver fluid in the driver bore 13 behind the driver piston 15. The acceleration profile of the driver piston 15 can be adjusted by adjusting the pressure behind the driver piston 15 (pressure of the accumulator 17). For example, the driver fluid pressure on the driver piston 15 can be adjusted by adjusting the valve 16 opening size or duration to control the driver fluid flow from the accumulator 17 and/or venting driver fluid from the driver bore 13 via ports 18 in the driver bore 13 behind the driver piston 15; these ports 18 have controllable valves (not shown) similar to the driver fluid valve 16. Means for adjusting the valve 16 opening size or duration to control the driver fluid flow from the accumulator 17 may be accomplished by pneumatic valve control means or electromagnetic valve control means. The acceleration profile of the driver piston 15 can also be controlled by controlling the pressure of the compression fluid in front (downstream) of the driver piston 15. Ports 18 (see FIG. 2A) in the wall of the compression driver 4 between the driver pistons 15 and the vessel wall 3 can be controlled to inject or vent the compression fluid. In addition, additional compressible fluid can be injected near the proximal end of the driver bore 13 to slow down the driver piston 15 to prevent impact with vessel 3. The length of the driver bore 13 can be designed to be long enough so that the trajectory of the driver piston 15 can be tuned by changing the pressure of the driver fluid and/or the pressure of the compression fluid. A number of sensors (not shown) can be provided to measure the position of the driver piston 15 or the opening duration of the driver fluid valve 16 and provide the measured signals to a controller (not shown). In another implementation, arc heating of the compression fluid by means of an electric arc generated across two electrodes 19 positioned at the distal end of the driver bore 13, between the compression driver piston 15 and the rotating core 2 may be used to tune the trajectory of the compression driver pistons 15 and pusher pistons 6.

In an alternative embodiment, an electromagnetic coil can control the opening duration of the driver fluid valve 16, which controls how much high pressure fluid enters the driver bore 13, which can be operated to control the acceleration of the driver piston 15. Alternatively, the acceleration profile of the driver piston can be directly controlled electromagnetically. In the embodiment wherein the prime mover comprises electromagnetic coils wrapped around the driver bore wall 14, an electromagnet electrically-conductive element in the driver piston, and an electromagnetic source coupled to the electromagnetic coils, can be operated to control the acceleration of the driver piston.

Figure 4:
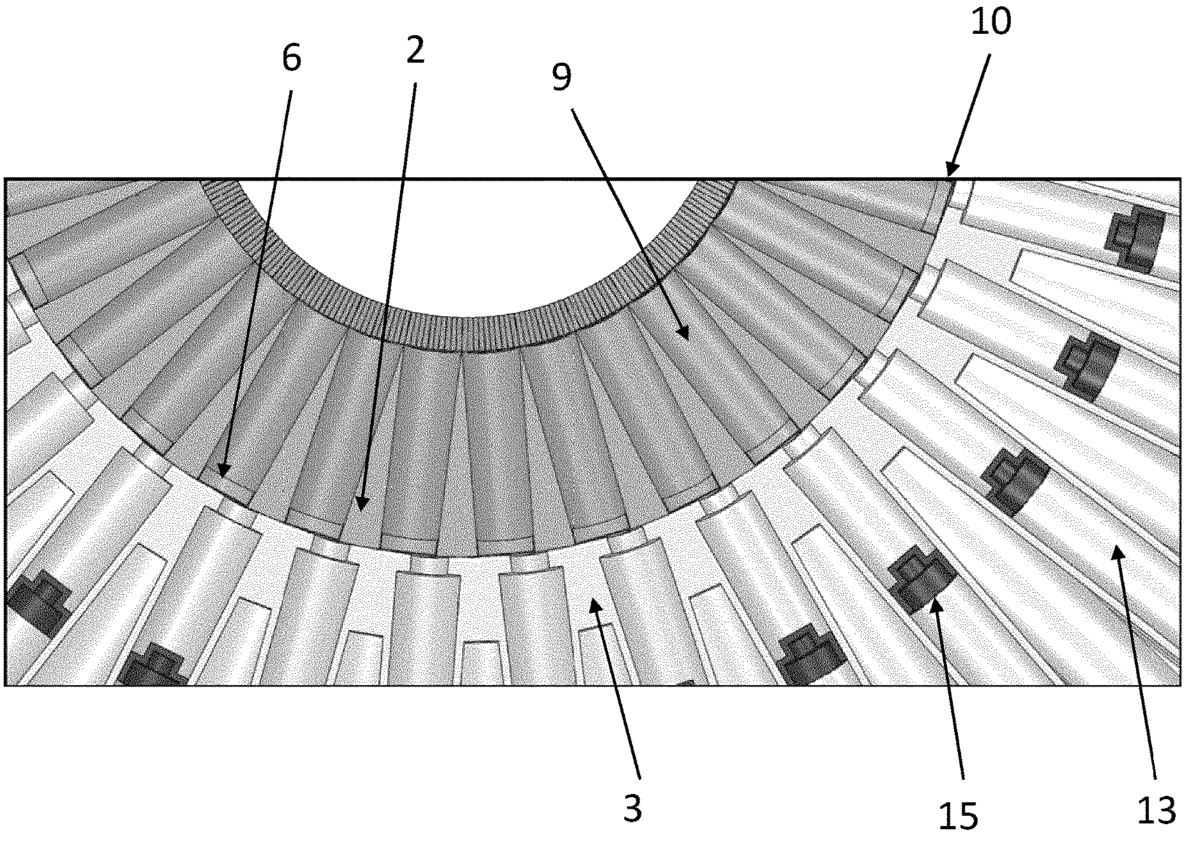
FIG. 4 is a partial cross-sectional plan view of the plasma compression system having compression drivers according to the first embodiment, showing the orientation of the compression drivers on the vessel and the orientation of the implosion drivers in the rotating core.

Referring particularly to FIG. 4, the compression drivers 4 are positioned radially on the outer surface of the vessel wall 3 and the implosion drivers consisting of pusher pistons 6 within pusher bores 9 extend radially within the rotating core 2. The compression driver pistons 15 are shown midway along their inward travel within the driver bore 13 toward the rotating core 2. In alternative embodiments the compression drivers 4 and implosion drivers can be positioned non-radially to the vessel 3 and rotating core 2, so long as the compression drivers 4 are positioned perpendicularly (i.e. normal), relative to the axis of rotation of the rotating core 2, and the implosion drivers 5 are positioned perpendicularly, relative to the axis of rotation of the rotating core 2.

Referring particularly to FIGS. 5A, 5B, 5C, and 5D, and 5E, a compression operation involves rapidly moving each driver piston 15 towards the vessel wall port 12 thereby compressing the compression fluid in the annular gap 10 and creating a pressure pulse against the pusher pistons 6, which then move inwards within the pusher bores 9 and pushes the liquid medium inwards through the rotating core 2 and into the vessel 3. Four basic stages of the compression operation are shown, wherein: Stage 1 is the initial (start) stage before the compression driver is triggered. In this stage the accumulator 17 is fully charged, the valve 16 is closed and the pistons 15, 6 are in their initial positions (FIG. 5A).

In Stage 2 (FIGS. 5B and C), the driver valve 16 is opened and the driver fluid in the accumulator 17 passes through the driver valve 16 and enters the driver bore 13 behind the driver piston 15, causing the driver piston 15 to accelerate along the driver bore 13 toward the rotating core 2. During Stage 2, the potential energy stored as a high pressure of the fluid in the accumulator 17 is converted into a kinetic energy in the motion of the driver piston 15 and the pressure of the compression fluid contained in the driver bore 13 rises. In Stage 3 (FIG. 5D, 15 ms) the driver piston 15 nears the rotating core 2, and the compressible fluid pressure in the annular gap 10 rises sharply as it absorbs the kinetic energy of the driver piston 15, such that the compression fluid pressure exceeds the pressure of the liquid medium in the pusher bores 9 holding the pusher pistons 6 in place. In Stage 4 (FIG. 5E, 19 ms) the pusher pistons 6 accelerates rapidly, pushing the liquid medium out of the pusher bores 9 and the rotating core 2.

Figure 7A:
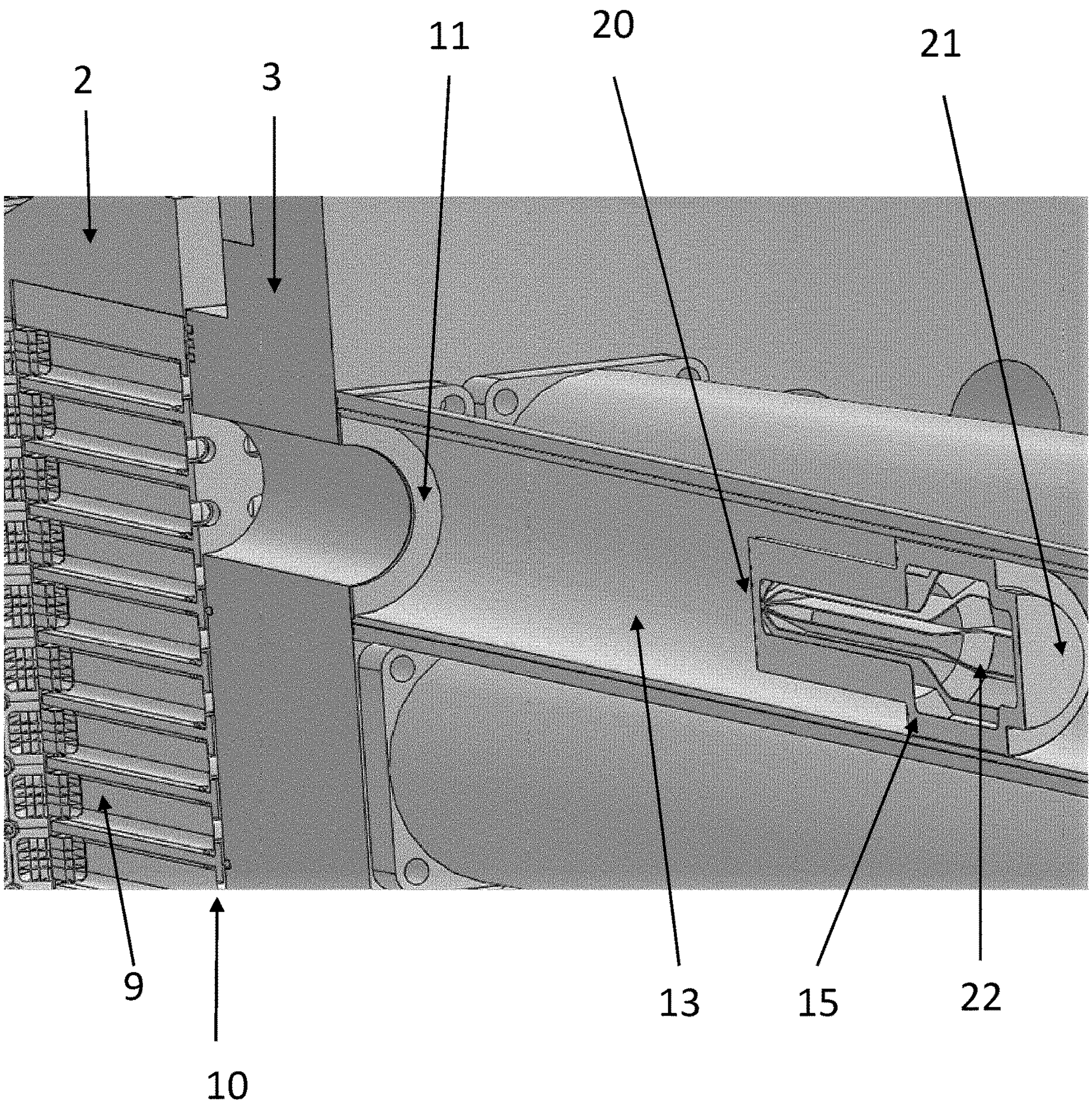
FIG. 7A is a partial cross-sectional perspective view of the driver piston of the first embodiment of the compression driver and multiple pusher pistons, in proximity to the vessel wall.
Figure 7B:
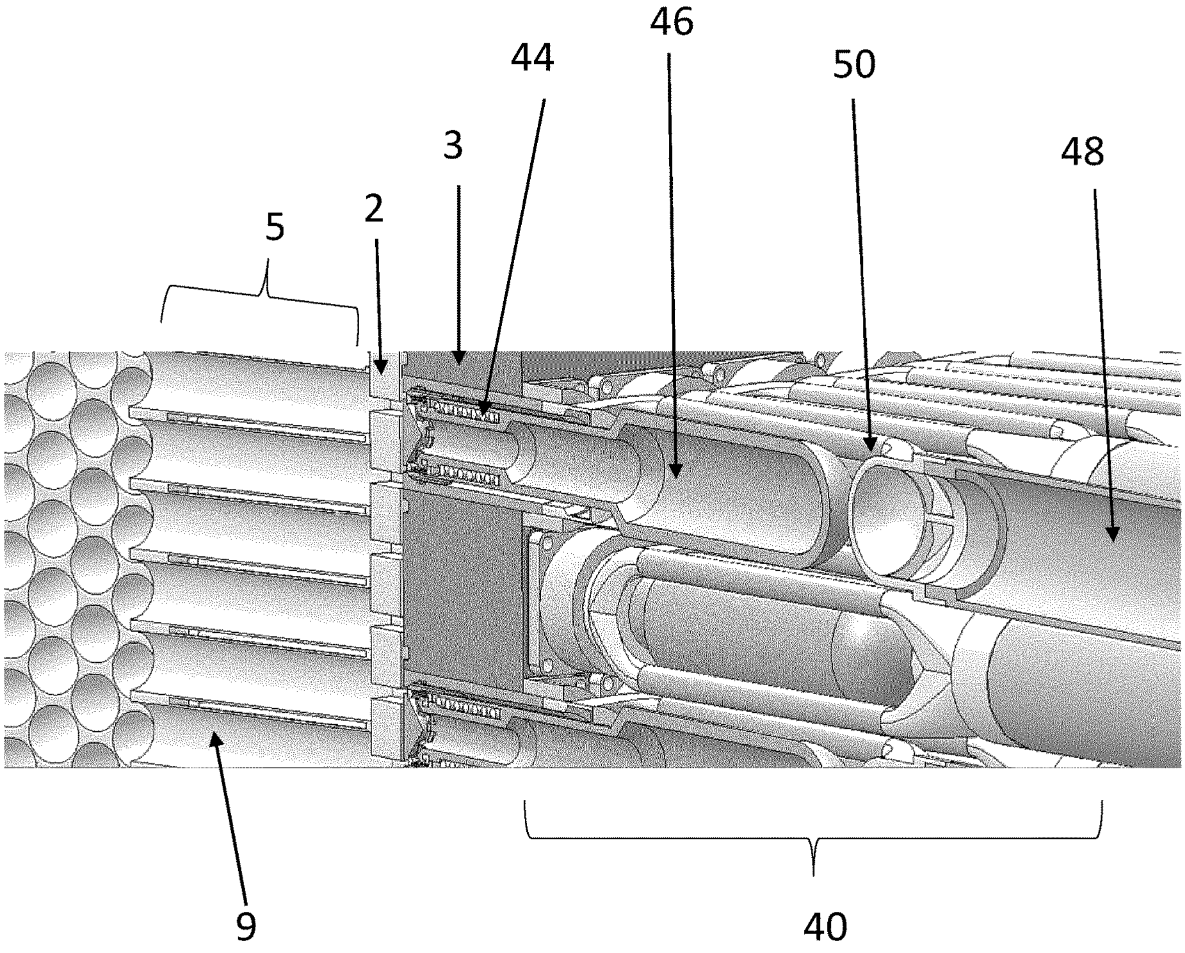
FIG. 7B is a partial cross-sectional perspective view of the multiple accumulators and drive valves of the second embodiment of the compression driver and multiple push pistons in proximity to the vessel wall.

Referring to FIG. 7A, an annular face surface 11 is provided at the distal end of the driver bore 13 and the vessel wall port 12. During the compression operation, the compression fluid applies an inward force on the annular face surface 11; in other words, the annular face surface 11 applies an inward force on the vessel 3 and serves as a pressure balancing lip such that the pressure pulse generated by the driver piston 15 will offset or reduce the pressure pulse generated by the pusher pistons pushing on the liquid medium in the pusher bore 16 and thus will reduce (minimize) the stress imparted by the compression drivers 4 on the vessel 3. Additionally, the driver piston 15 has a distal end 20 designed to cooperate with the annular face surface 11 to define an annular channel when the driver piston 15 reaches the vessel wall 3, wherein the compression fluid is highly compressed. The high pressure of the compression fluid in the annular channel serves to slow down the driver piston 15 and prevent the impact with the annular face surface 41 and the vessel wall 3.

More particularly, the driver piston 15 comprises a cylindrical first section with a distal end 20 and a diameter corresponding to the diameter of the vessel wall port 12, and a cylindrical second section with a proximal end 21 and a diameter corresponding to the diameter of the driver bore 13; the two sections are connected by an annular ledge. The annular rim of the first section and the annular ledge along with the annular face surface 11 form the aforementioned annular channel. Persons skilled in the art would understand that the driver piston 15 can have other shapes in alternative embodiments. A number of gussets 22 are formed inside the periphery of the driver piston 15 to further reduce weight while maintaining strength and the stiffness.

Figure 8:
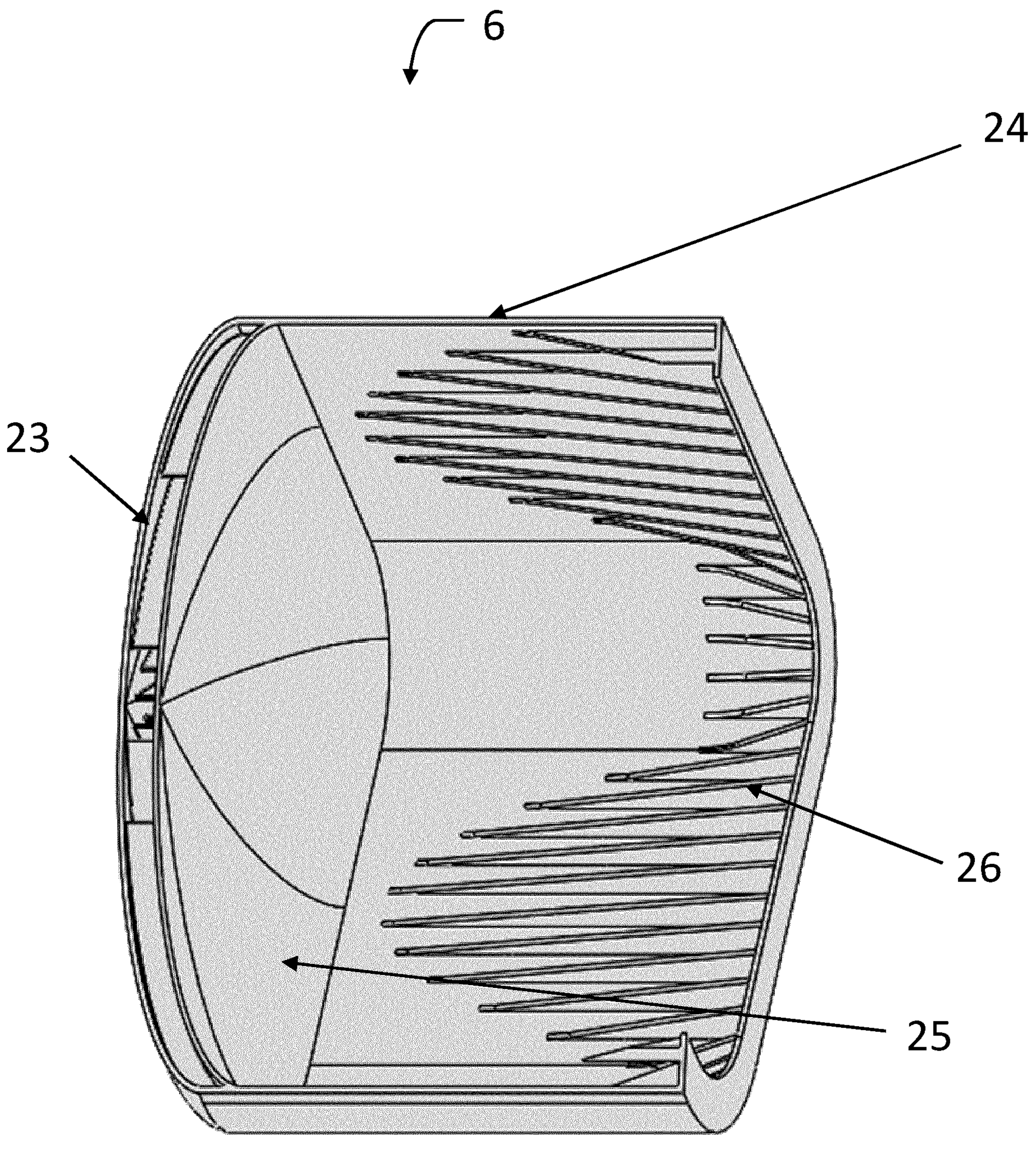
FIG. 8 is a cross-sectional perspective partial view of a pusher piston according to one embodiment.

Referring to FIG. 8 the pusher piston 6 in this embodiment has a planar or curved outer (proximal) wall 23, an inner (distal) wall 25 and a side wall 24. The inner wall 25 faces the liquid liner 27, and the side wall 24 interfaces with the pusher bore 9. The outer wall 23 faces the annular gap 10. The pusher piston 6 can further comprise a plurality of gussets 26 formed at the side wall 24. The gussets 26 are configured to increase the stiffness of the pusher piston 6. In one implementation, the side wall 24 can be a solid plate that encloses the gussets 26 such that the gussets 26 are not in contact with the fluid contained in the pusher bore 9. Persons skilled in the art would understand that the gussets 26 can be omitted in alternate embodiments, which may instead use a material that can provide the desired stiffness (and lightness) or by adding different stiffener features. The pusher piston 6 can further comprises a number of seal seats (not shown) around the circumference of the side wall 24 or positioned on the outer wall 23.

Figure 9A:
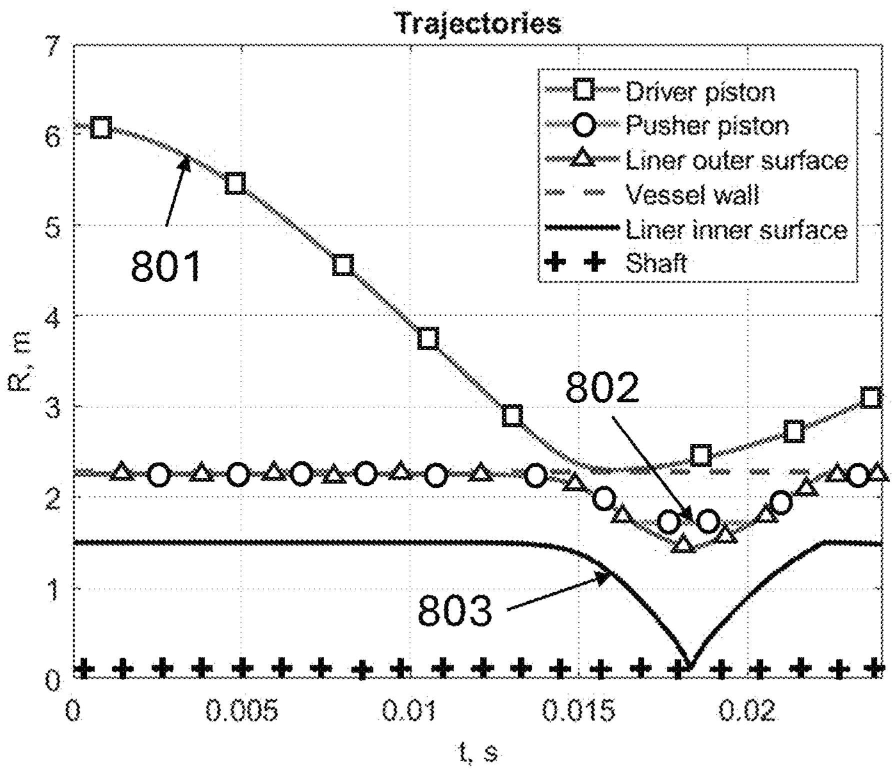
FIG. 9A is a graphical presentation of position trajectory over time of a driver piston, a pusher piston, and a liner interface during a compression operation.
Figure 9B:
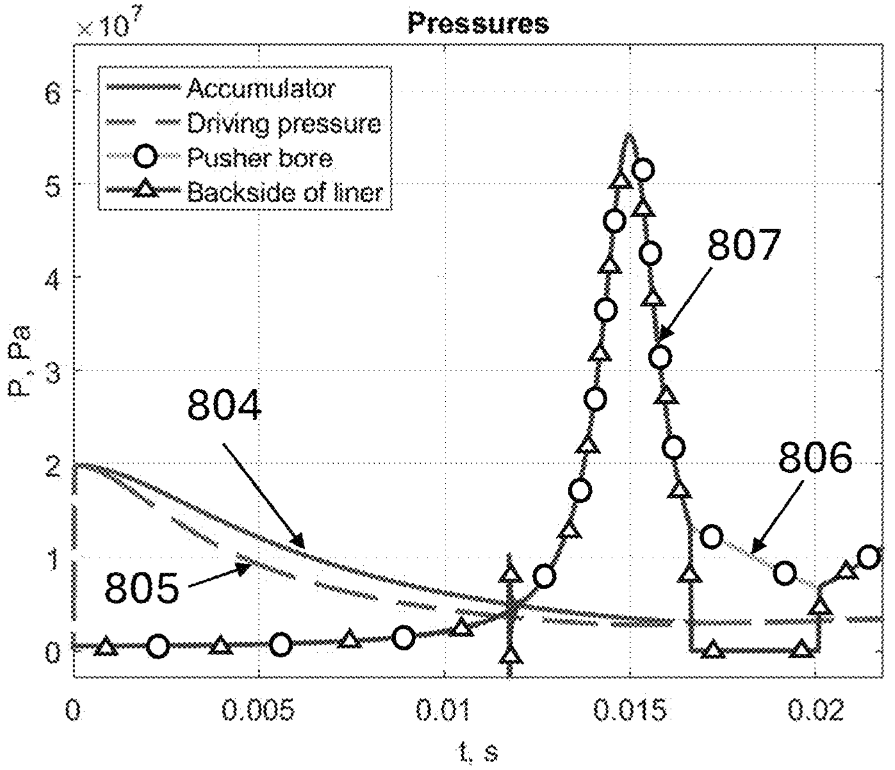
FIG. 9B is a graphical presentation of a pressure pulse over time at a driver bore and at a pusher bore on the backside of the liquid liner, during the compression operation.

FIG. 9A graphically illustrates the position trajectory over time of a driver piston (curve 801), a pusher piston (curve 802) and a liner inner interface (curve 803) over an exemplary compression operation. FIG. 8B illustrates a pressure pulse at an accumulator (curve 804), a driver bore (curve 805), a pusher bore (curve 806), and the back (outer surface) of the liquid liner (curve 807) during this compression operation. The compression drivers 4 are used to implode a liquid liner to collapse a cavity with radius of about 1.5 m that is formed within the liquid liner. As can be seen in the graph, the pusher piston and the liquid liner (see respective curves 802 and 803) accelerate only when the driver piston (curve 801) is near the pusher piston. Peak pressure at the end of the driver bore and beginning of the pusher bore (curve 805) and a peak pressure at the wall of the vessel (curve 806) occur at the same time, when the pusher piston is accelerated.

Figure 10A:
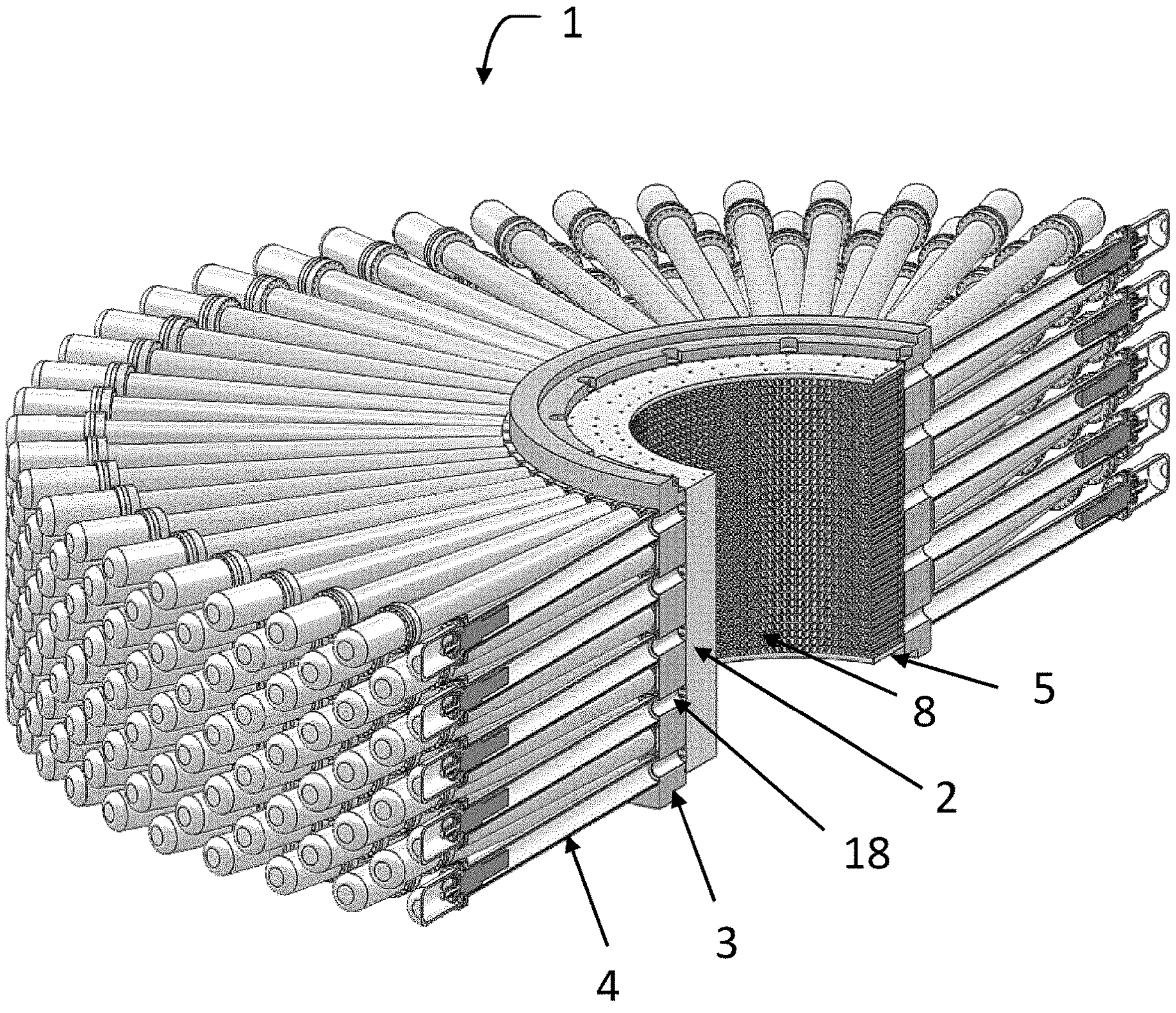
Figure 10B:
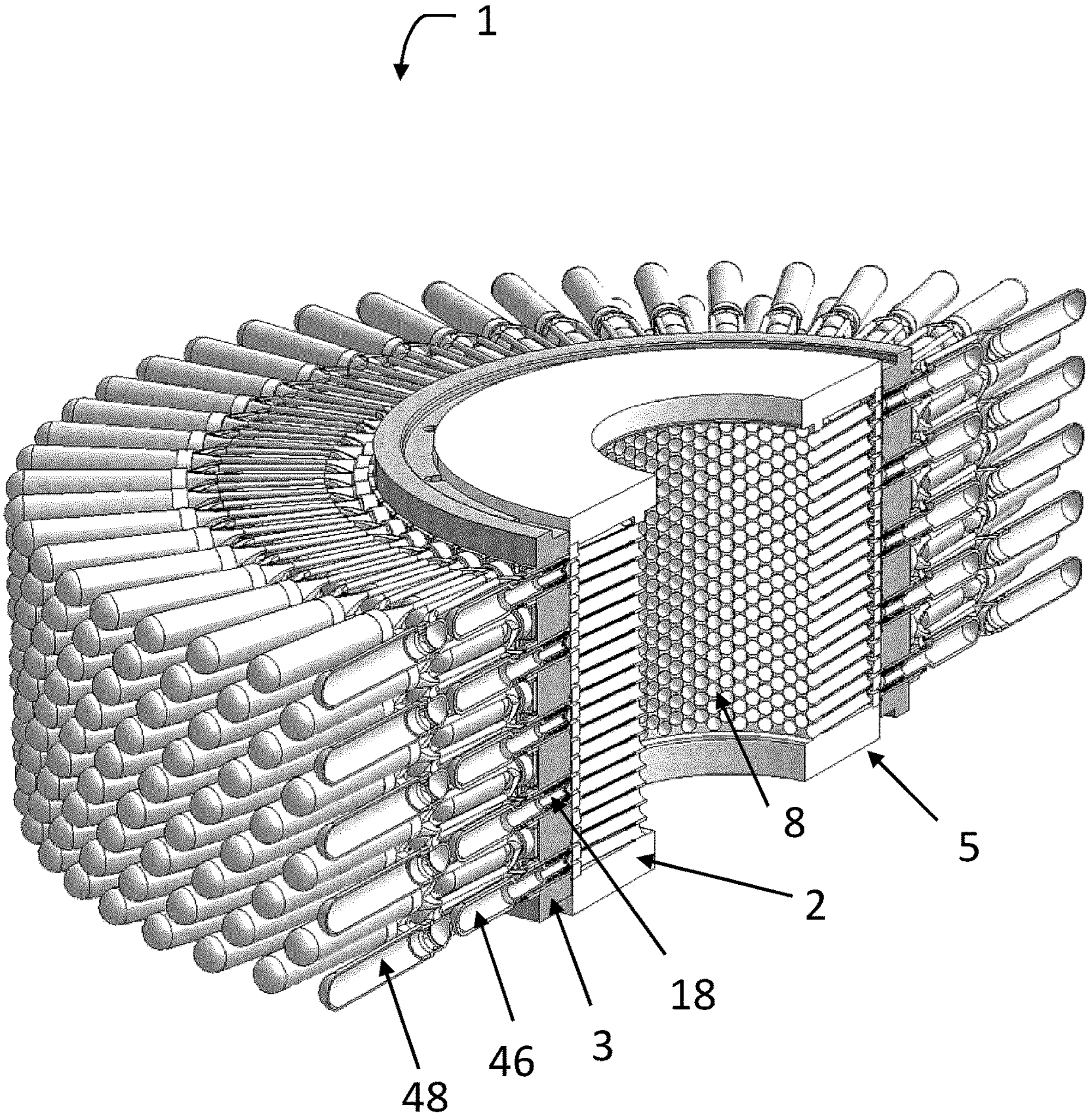
FIG. 10B shows the second embodiment of the compression drivers.

FIG. 10A illustrates a cutaway view of the plasma compression system 1, showing nine layers of compression drivers, the vessel 3 and the rotating member 2. The vessel 3 contains a plurality of ports 12 into which the compression drivers 4 are attached.

Referring now to FIGS. 2B, 6A-D, 7B and 10B, and according to an alternative embodiment, the plasma compression system 1 comprises compression drivers 40 that use pressurized gas instead of driver pistons to deliver a pressure pulse into the annular gap 10. The compression driver 40 as shown in these Figures has a generally cylindrical valve housing 42 fixedly mounted at one end to an outer surface of the vessel wall 3, and contains a drive valve 44 that is in fluid communication with a vessel wall opening 3 and an accumulator 46. The accumulator 46 is a pressure vessel that contains a highly pressurized compression fluid. The initial and intermediate pressures of the compressible fluid in the accumulator 46 and the timing of the release of the compressible fluid through the drive valve 44 contribute to achieving the synchronized, shaped collapse of the liquid liner. In one embodiment, the pressure of the compression fluid can be fine-tuned prior to the compression shot by using a heating element 53 disposed within the accumulator 46 to heat the compression fluid. In another implementation, the pressure of the compression fluid can be fine-tuned during the compression shot by heating the compression fluid by means of an electric arc generated across two electrodes 19 positioned within the accumulator 46. The compression fluid can be any fluid that can be compressed and can in one implementation be a gas, such as helium. In another implementation, the compression fluid can be a mixture of a gas and a saturated (dry) steam.

The drive valve 44 can be a conical seat shut off valve like the type disclosed in U.S. Pat. No. 8,336,849; however persons skilled in the art would appreciate that other suitable valve designs can also be used. The drive valve 44 is communicative with a controller which has a processor and a computer readable memory having encoded thereon instructions executable by the processor to open the drive valve 44 to discharge the accumulator gas into the annular gap in a compression operation.

A pressure relief tank 48 is provided to receive the compression fluid from the annular gap 10 after the pressure pulse has actuated the implosion drivers 5. The pressure relief tank 48 is fluidly coupled to the vessel wall opening 3 by a compression fluid return conduit 50, which comprises an annular passage extending lengthwise between the vessel wall opening 3 and the accumulator pressure vessel 46, and multiple manifolds that extend lengthwise along the outside of the accumulator pressure vessel 46 to openings at the distal end of the pressure relief tank 48. A rebound valve 52 is located at the distal end of the compression fluid return conduit 50 and near the vessel wall opening 3, and is communicative with the controller which is programmed to open the rebound valve 52 to allow the relief tank 48 to receive the compression fluid at the end of the compression operation.

Figure 6A:
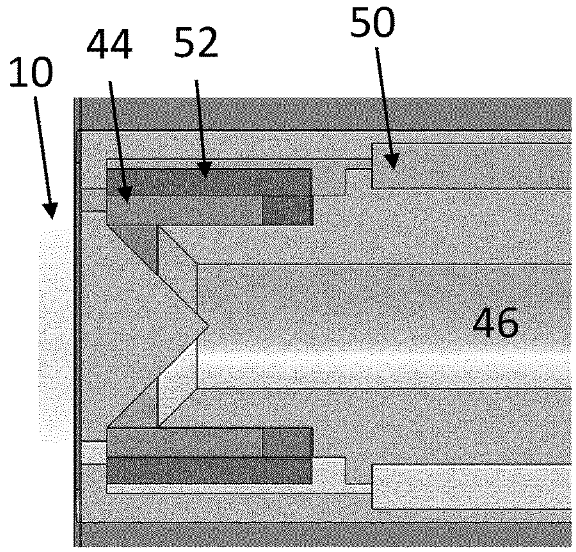
Figure 6B:
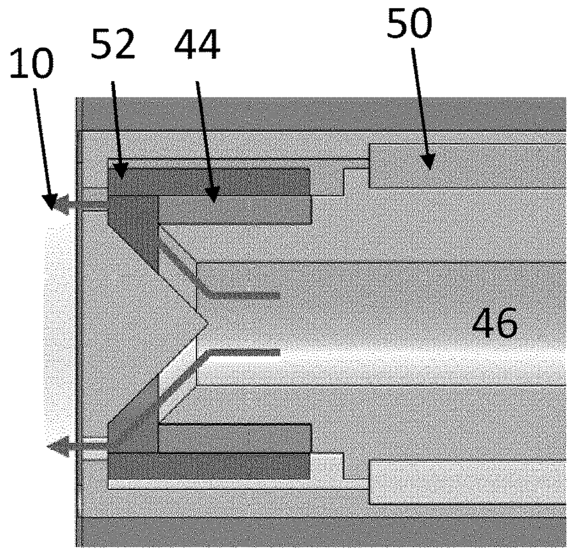
Figure 6C:
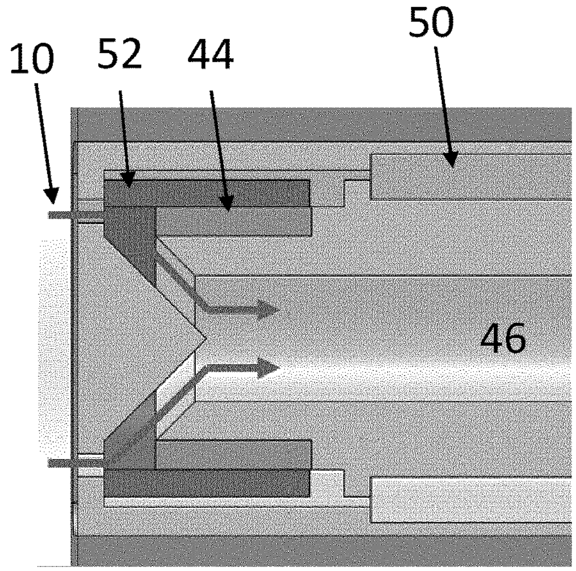
Figure 6D:
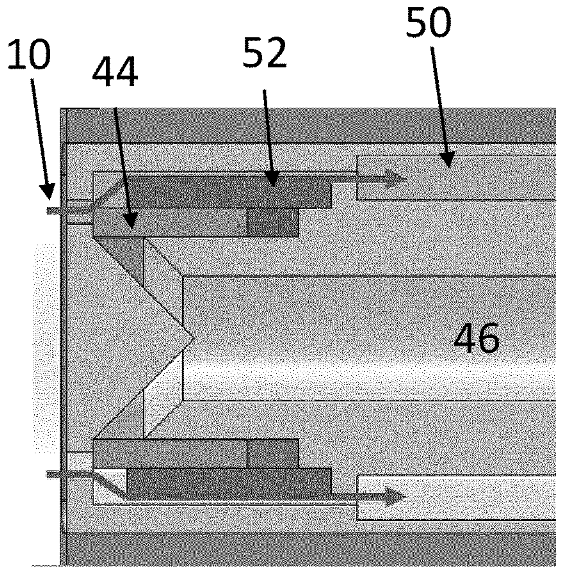

Referring to FIGS. 6A-6D, the controller controls the opening and closing of the drive valve 44 and rebound valve 52 over four phases of a compression shot. As shown in FIG. 6A and during a pre-shot phase, both the drive valve 44 and rebound valve 52 are closed and the accumulator pressure vessel 46 is filled with high pressure compression fluid. As shown in FIG. 6B, and during a compression phase, the controller opens the drive valve 44 and the accumulator gas is discharged directly into the annular gap 10, as shown by the arrows. This creates a rapid pulse of pressure in the annular gap 10 and provides the motive force to accelerate the pusher pistons 6 which in turn collapse the liquid liner and compress the plasma target. As shown in FIG. 6C, and during a rebound recovery phase, the controller keeps the drive valve 44 open and the rebound valve 52 closed, and the liquid liner rebounds and some of the compression fluid flows back into the accumulator pressure vessel 46 as shown by the arrows. As shown in FIG. 6D and during an energy dissipation phase, the controller closes the drive valve 44 and opens the rebound valve 52, and the rest of the compression fluid flows from the annular gap 10, past the rebound valve 52, through the compression fluid return conduit 50, and into the relief tank 48. This process brings the pressure in the annular gap 10 back down to a level which allows the rest of the plasma compression system to reset for the next compression shot, and serves to recapture a portion of the energy returned by the rebound of the liquid line back into the rotating core and pusher bores. Once the pressures have equalized, the controller closes the rebound valve 52 to maintain system reset status and begins preparations for the next compression shot.

Alternatively (not shown), the opening and closing of the valves during the four phases of the compression shot can be provided by a mechanical system instead of the controller. The mechanical system comprises mechanical timing devices known in the art, such as a spring-actuated poppet.

In the illustrated embodiment, each compression driver 40 comprises its own accumulator 46; however in alternative embodiments, multiple compression drivers 40 can share a single accumulator, for example, one accumulator can be provided for each layer of compression drivers 40 (not shown), or a single accumulator can be provided for all the compression drivers 40 (not shown).

Figure 11A:
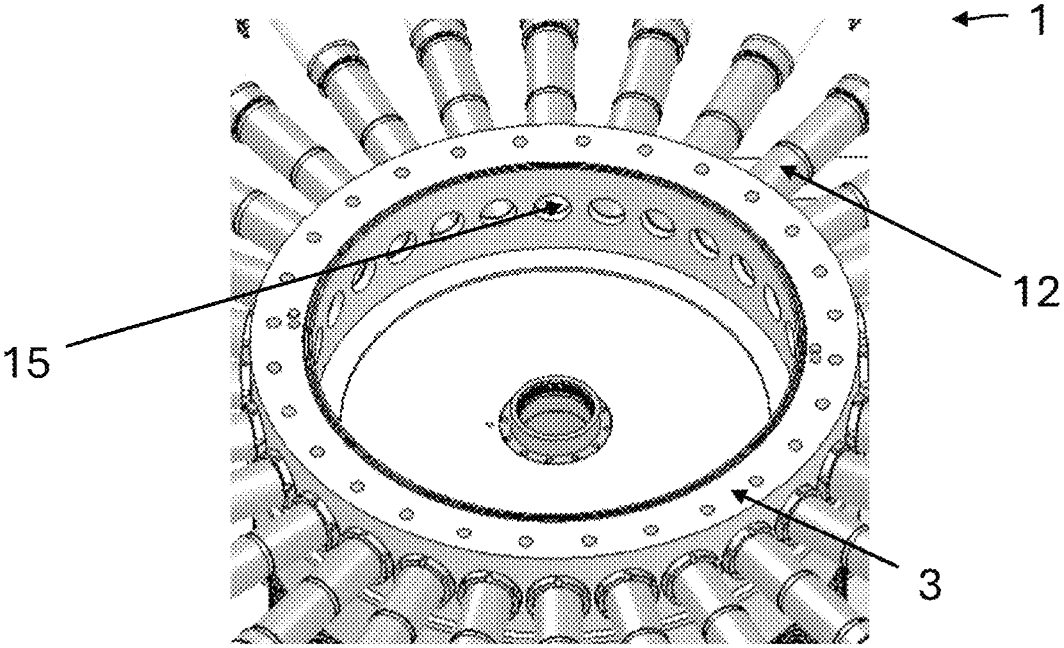
FIG. 11A is a photograph of a portion of the prototype embodiment of the plasma compression system, showing the vessel with plurality of compression drivers coupled to the ports of the vessel, wherein the driver pistons are positioned at the inner surface of the vessel wall.
Figure 11B:
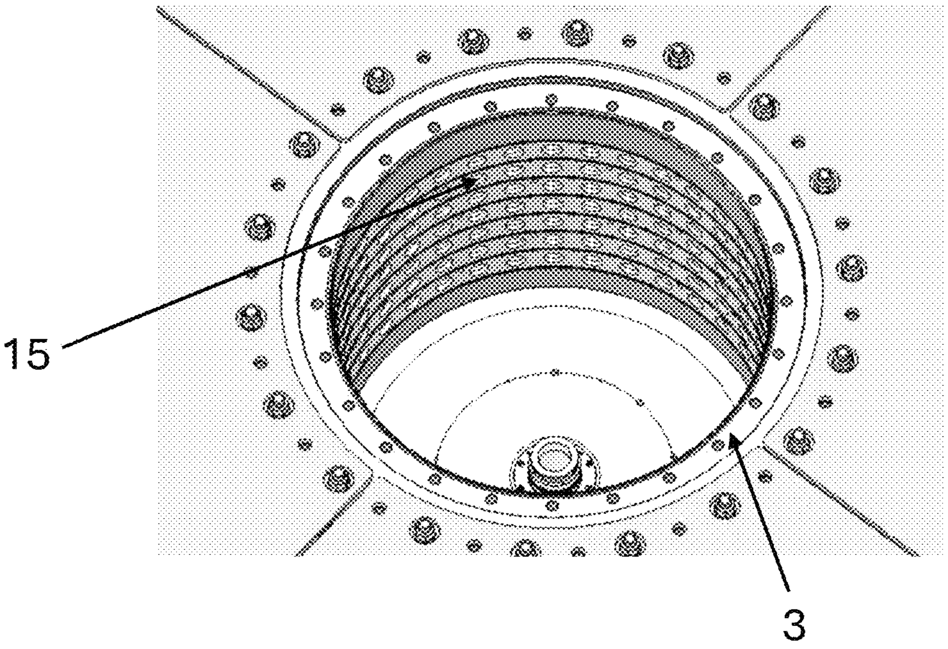
FIG. 11B is a photograph of the prototype embodiment showing the inner surface of the vessel wall comprising multiple layers of ports.
Figure 12:
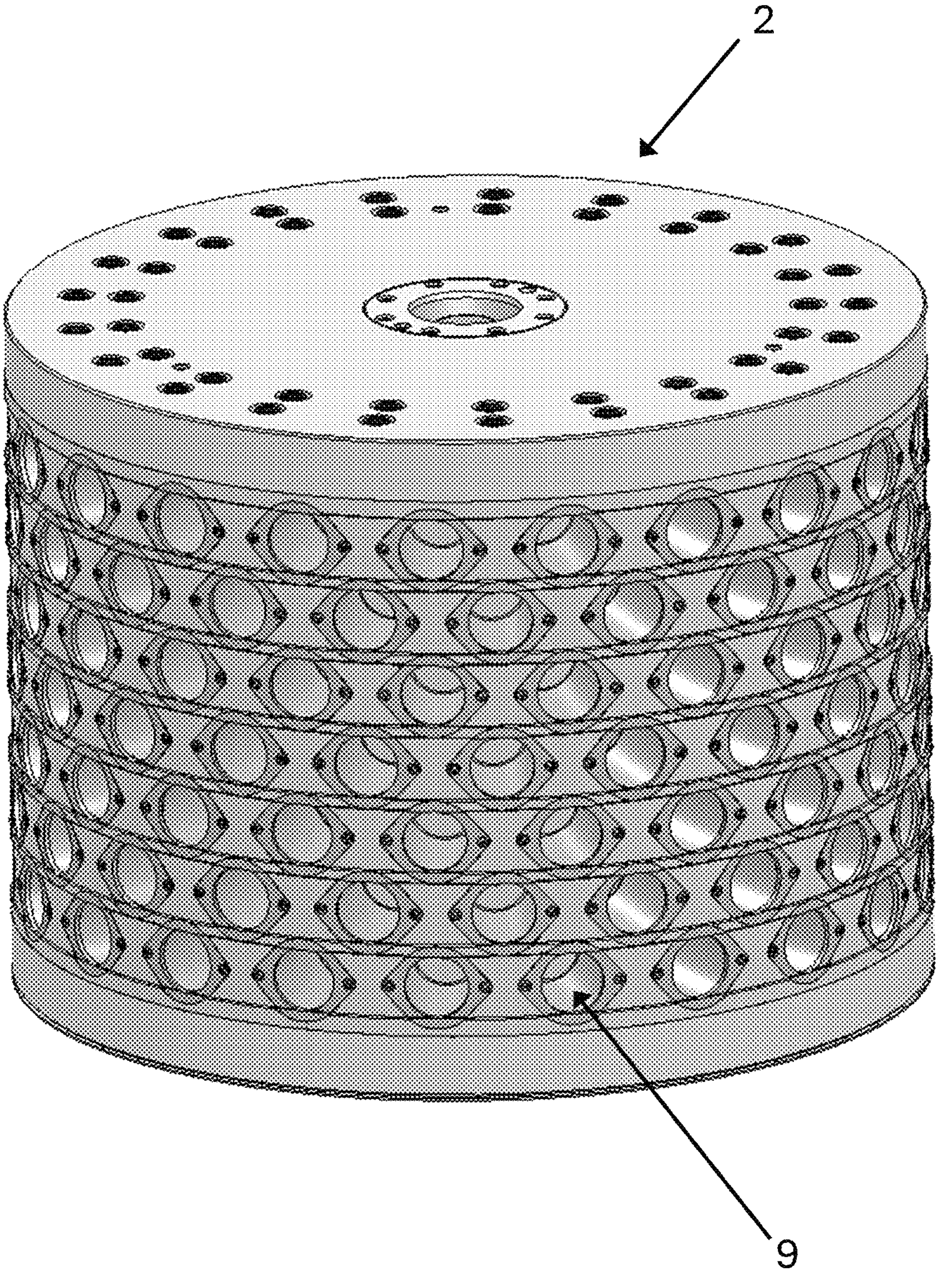
FIG. 12 is a photograph of a rotating core of the prototype embodiment, showing the pusher bores.
Figure 13:
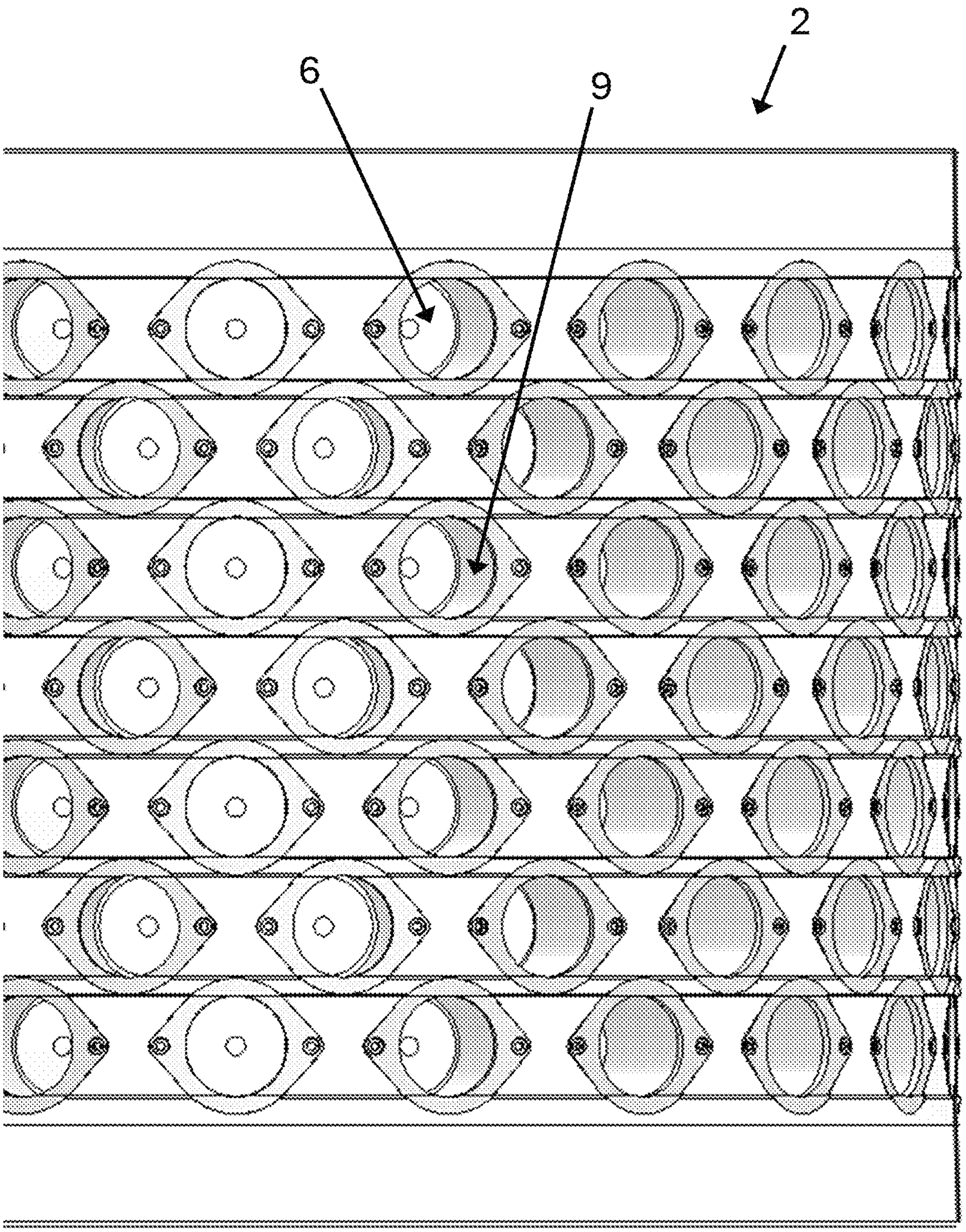
FIG. 13 is a photograph of the rotating core of the prototype embodiment, showing the pusher pistons in the pusher bores.
Figure 14:
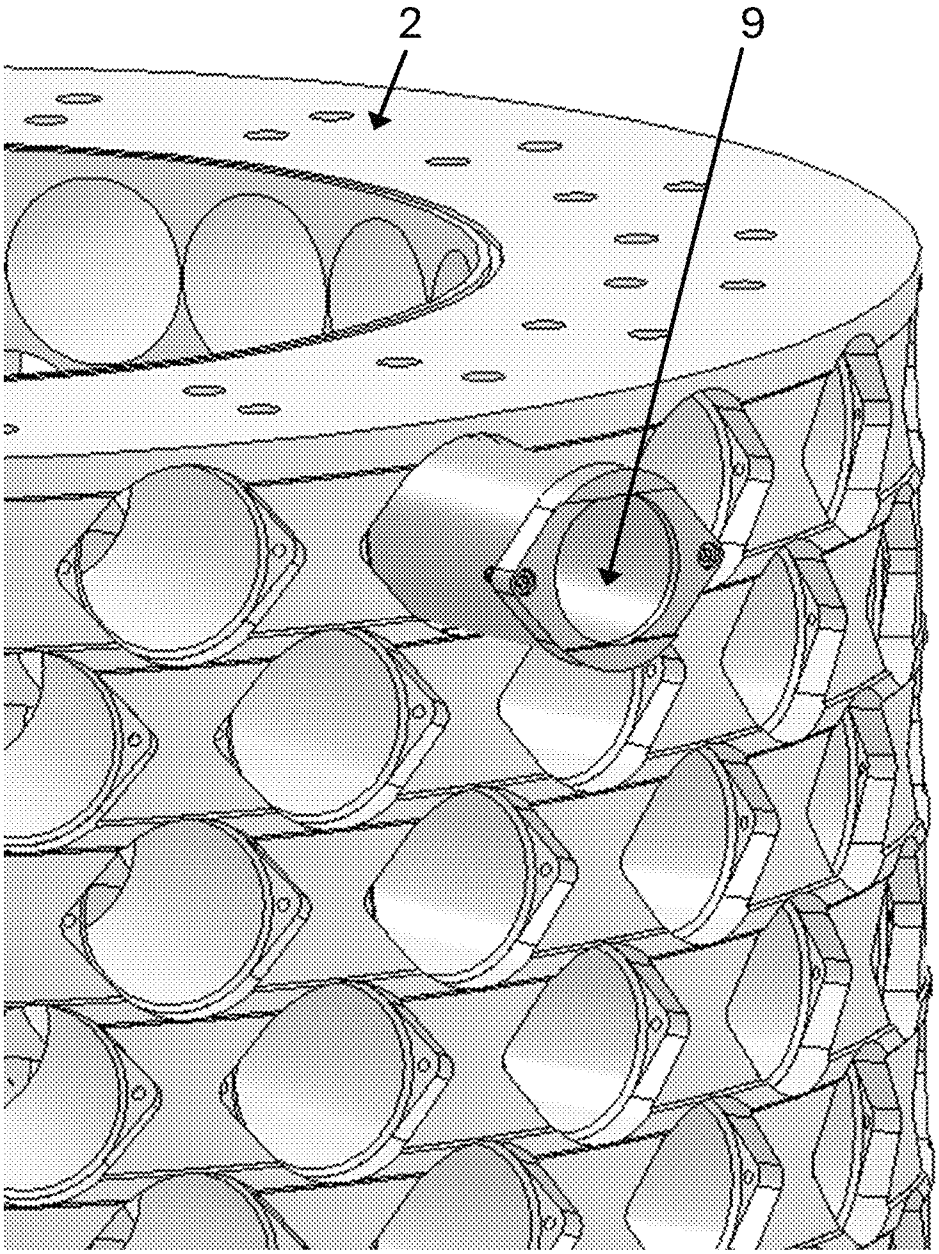
FIG. 14 is a photograph of a portion of the rotating core of the prototype embodiment in partially dissembled state, namely with a pusher bore partially inserted into the rotating core.

Referring to FIG. 11A, early prototypes featured a single-layer of compression drivers, and as can be seen in FIG. 11B later prototyped featured multiple layers of compression drivers. FIG. 12 is a photograph of a prototype rotating core 2 used in the multi-layered compression driver prototype shown in FIG. 11B. In an operational plasma compression prototype, the opening at the top of the rotating core 2 is the orifice through which plasma is injected into the evacuated cavity 28, prior to cavity implosion. This example of the rotating core shows multiple layers of pusher pistons 6 each positioned within pusher piston bores 9 (FIG. 13). The pusher piston bores 9 are sleeved and may be removed for maintenance (FIG. 14).

Figure 15C:
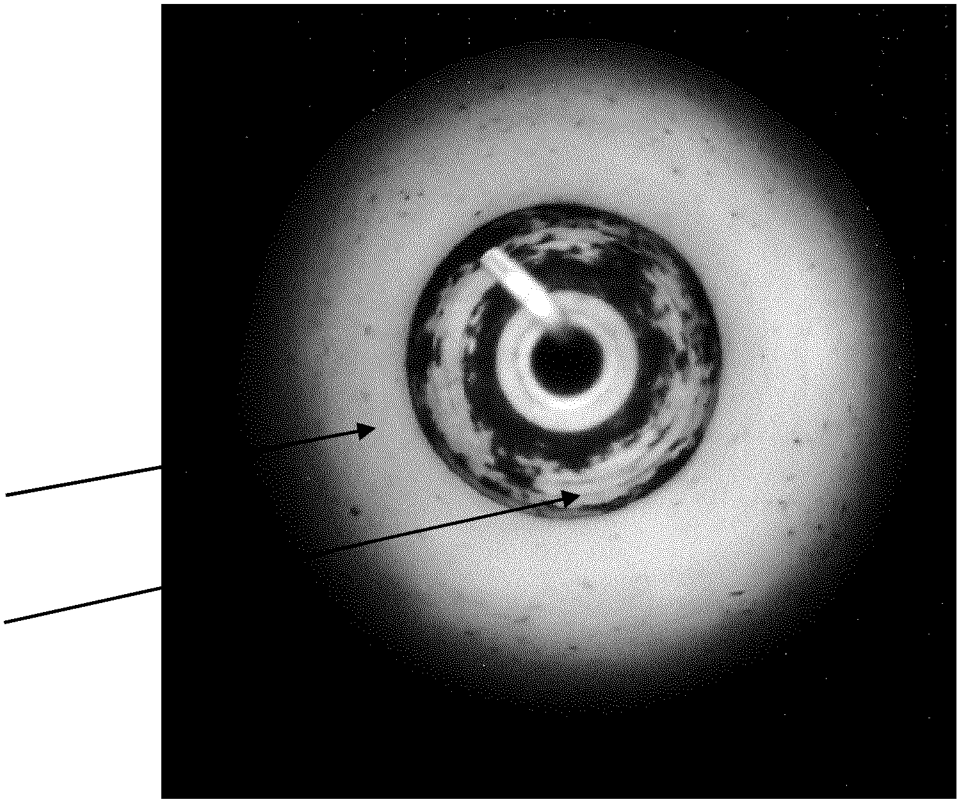
Figure 15D:
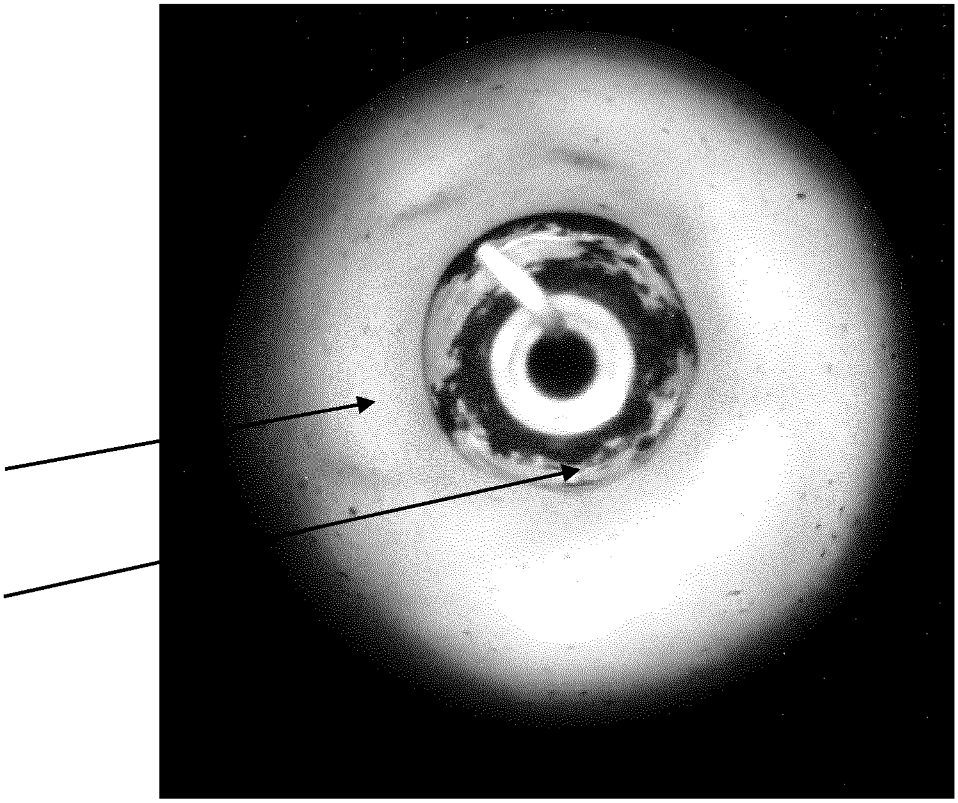

FIGS. 15A through 15D show the time series of an experimental fluid compression operation, where the rotating liquid liner 27 has been radially compressed into the cavity 28 using the compression driver system 4 described herein. FIG. 15A shows the rotating liquid liner 27 at the start of the compression cycle, which would occur when the driver and pusher pistons 15, 6 are in their initial start positions, as shown in FIG. 5A. As the pusher pistons (not shown in the photograph) proceed inward, the liquid in the pusher bores is displaced inward toward the center of the cavity 28 (FIGS. 15B and 15C). FIG. 15D shows the liquid liner 27 near the terminus of its collapse, which would occur when the driver and pusher pistons 15, 6 are in their terminal positions, as shown in FIG. 5E. The use of a liquid liner such as lithium or lead for example, protects the walls of the rotating member 2 and other structural components from damaging energetic particles that result from the fusion reaction, and circulation of the liquid liner out of the rotating core 2 also serves as a means for removing heat energy from the core 2 and vessel 3.

Figure 16:
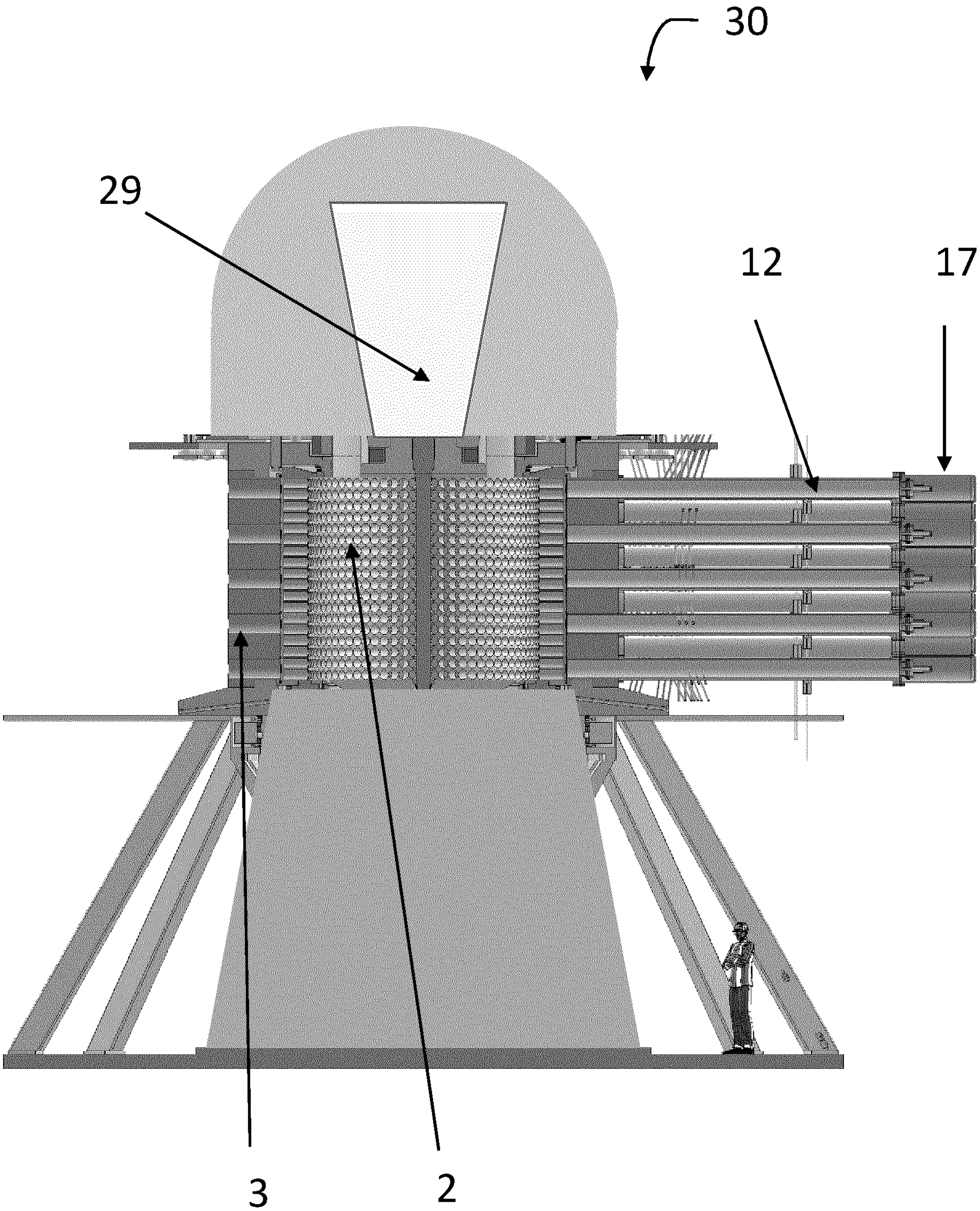
FIG. 16 is a cross-sectional diagram of the plasma compression system coupled to a fusion energy device.

FIG. 16 shows a partial cutaway diagram of an example of a plasma compression system 1 as configured within a fusion energy device 30. The plasma generator 29 generates and injects plasma into the evacuated cavity (not shown) formed by the rotation of the liquid liner (not shown) by the rotating member 2. The liquid liner in some implementations may be molten metal, such as lithium or lead, or any mixture of molten material. When the plasma is correctly positioned within the evacuated cavity of the rotating liquid liner, the valves (not shown) release pressure from the accumulators 17 into the compression drivers 4 and drive the pusher pistons (not shown) inward, starting the collapse of the liquid liner. This collapse compresses the plasma to fusion conditions, and as the fusion reaction proceeds, energy is liberated in the form of heat.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. A plasma compression system comprising:

a plasma containment vessel comprising a vessel wall; and an annular rotating core containing a liquid medium and rotatable inside the vessel to circulate the liquid medium and form a liquid liner with a cavity, the rotating core comprising an outer surface spaced from an inner surface of the vessel wall to define an annular gap, and a plurality of implosion drivers each comprising a pusher bore with a pusher piston slideable therein, each pusher bore extending through the rotating core and having a proximal end in fluid communication with the annular gap and a distal end in fluid communication with the liquid medium;

wherein the pusher pistons are operable, as the rotating core rotates, to push the liquid medium inwards to collapse the liquid liner and compress a plasma in the cavity.

2. The plasma compression system of claim 1, further comprising:

a plurality of compression drivers, each comprising a driver bore with a driver piston slideable therein, each driver bore fixedly mounted to an outer surface of the vessel wall and having a distal end in fluid communication with a vessel wall opening in the vessel wall;

a prime mover operable to move the driver piston along the driver bore; and a compression fluid in the annular gap and the driver bores and in fluid communication with the driver and pusher pistons;

wherein movement of the driver pistons towards the vessel wall openings compresses the compression fluid and creates a pressure pulse that moves the pusher pistons.

3. The plasma compression system as claimed in claim 2, wherein the pusher bore has a shorter length than the driver bore, and the pusher piston has a lower mass than the driver piston.

4. The plasma compression system as claimed in claim 2, wherein the compression fluid is helium.

5. The plasma compression system as claimed in claim 2, wherein the plurality of compression drivers extend generally radially relative to a rotational axis of the rotating core and are arranged in a plurality of layers outside of the vessel, the plurality of layers stacked axially to the rotational axis.

6. The plasma compression system as claimed in claim 2, wherein each driver bore has a larger diameter than the vessel wall opening, and each compression driver further comprises an annular face surface interconnecting the vessel wall opening and a distal end of the driver bore, and whereby compression of the compression fluid applies an inward pressure on the annular face surface which counteracts an outward pressure on the vessel.

7. The plasma compression system as claimed in claim 6, wherein the driver piston comprises an annular ledge parallel to the annular face surface and an annular rim perpendicular to and adjacent the annular ledge, such that a compression fluid channel is formed by the annular rim, annular face surface and annular ledge when the driver piston is at the vessel wall opening.

8. The plasma compression system as claimed in claim 2, wherein the prime mover comprises an accumulator containing a pressurized driver fluid and a driver fluid valve fluidly coupling the accumulator to each driver piston.

9. The plasma compression system as claimed in claim 8, wherein the driver fluid valve is adjustable to adjust a pressure applied to the driver pistons by the driver fluid.

10. The plasma compression system as claimed in claim 8, further comprising at least one venting port in the driver bores for venting the driver fluid or the compression fluid from the driver bores, the venting port comprising a venting valve adjustable to adjust a pressure applied to the driver pistons by the driver fluid or the compression fluid thereby controlling the acceleration profile of the driver piston.

11. The plasma compression system as claimed in claim 2, wherein the prime mover comprises an electromagnetic source, electromagnetic coils at the driver bore, and an electrically-conductive element in each driver piston.

12. The plasma compression system as claimed in claim 11, wherein the electromagnetic coils extend along a length the driver bore, and the electromagnetic source is operable to adjust the magnetic field along the length of the driver bore thereby controlling the acceleration profile of the driver piston.

13. The plasma compression system as claimed in claim 2, wherein the prime mover comprises a mechanical spring.

14. The plasma compression system as claimed in claim 2, further comprising electrodes at the distal end of the driver bores, the electrodes operable to generate an electrical arc to heat the compression fluid.

15. The plasma compression system as claimed in claim 1, wherein the vessel has a shape selected from a group consisting of cylindrical, ovoid and spherical, and the outer surface of the rotating core has a curvature conforming to a curvature of the inner surface of the vessel wall.

16. The plasma compression system of claim 1, further comprising:

a plurality of compression drivers, each fixedly mounted to an outer surface of the vessel wall and comprising an accumulator for storing a pressurized gas and a drive valve in fluid communication with the accumulator and a vessel wall opening in the vessel wall;

wherein the drive valves are operable to discharge pressurized gas from the accumulators into the annular gap thereby creating a pressure pulse that moves the pusher pistons and pushes the liquid medium inwards.

17. The plasma compression system of claim 16, wherein each compression driver further comprises a relief tank and a rebound valve in fluid communication with the relief tank and the vessel wall opening, and wherein the rebound valves are operable to open after the pressurized gas has discharged into the annular gap and the drive valves are closed, thereby allowing the pressurized gas to flow from the annular gap into the relief tanks.

18. The plasma compression system as claimed in claim 17, further comprising a controller in communication with the drive valve and rebound valve, the controller having a processor and a computer-readable memory having encoded thereon instructions that when executed by the processor causes the controller to open the drive valve and close the rebound valve during a compression phase of a compression shot wherein the pressurized gas flows from the accumulator into the annular gap, to keep the drive valve open and the rebound valve closed during a rebound recovery phase of the compression shot wherein some of the pressurized gas flows from the annular gap into the accumulator, and to close the drive valve and open the rebound valve during an energy dissipation phase wherein some other of the pressurized gas flows from the annular gap into the relief tank.

19. The plasma compression system as claimed in claim 16, further comprising one or more heating elements positioned within the accumulator, the one or more heating elements operable to heat the compression fluid prior to the compression shot.

20. The plasma compression system as claimed in claim 16, further comprising one or more electrodes positioned within the accumulator, the one or more electrodes operable to generate an electrical arc to heat the compression fluid during the compression shot.

21. The plasma compression system as claimed in claim 1, further comprising a plasma generator in fluid communication with the vessel and operable to inject a plasma into the cavity.

22. The plasma compression system as claimed in claim 1, wherein the plurality of implosion drivers extend generally radially relative to a rotational axis of the rotating core and are arranged in a plurality of layers that are stacked axially to the rotational axis.

* * * * *